US012665834B2

(12) United States Patent
Guo et al.

(10) Patent No.: US 12,665,834 B2
(45) Date of Patent: Jun. 23, 2026

(54) MULTI-AGENT REINFORCEMENT LEARNING AIDED SMART AGRICULTURE NETWORKS

(71) Applicant: Mitsubishi Electric Research Laboratories, Inc., Cambridge, MA (US)

(72) Inventors: Jianlin Guo, Cambridge, MA (US); Guojun Xiong, Cambridge, MA (US); Kieran Parsons, Cambridge, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 303 days.

(21) Appl. No.: 18/607,812

(22) Filed: Mar. 18, 2024

(65) Prior Publication Data

US 2025/0293968 A1 Sep. 18, 2025

(51) Int. Cl.
*H04L 45/02* (2022.01)
*G06N 3/092* (2023.01)
(Continued)

(52) U.S. Cl.
CPC ............. *H04L 45/08* (2013.01); *G06N 3/092* (2023.01); *G06N 7/01* (2023.01); *H04B 7/18506* (2013.01); *H04W 4/44* (2018.02); *H04W 84/18* (2013.01)

(58) Field of Classification Search
CPC ...... G06N 3/092; G06N 7/01; H04B 7/18506; H04L 45/08; H04L 67/10; H04L 67/12; H04L 69/18; H04W 4/44; H04W 84/18
See application file for complete search history.

(56) References Cited

U.S. PATENT DOCUMENTS 9,917,735 B2 * 3/2018 Park ........................ H04W 4/38
10,084,868 B2 * 9/2018 Chandra ................ G01C 11/02
(Continued)

OTHER PUBLICATIONS

Zhang et al., Energy-Efficient Data Collection and Trajectory Design for UAV-Enabled Wireless Sensor Network, 2022, IEEE, 2022 IEEE 5th International Conference on Electronics Technology (ICET), pp. 933-938, doi: 10.1109/ICET55676.2022.9824168 (Year: 2022).*
(Continued)

*Primary Examiner* — Eric Nowlin
(74) *Attorney, Agent, or Firm* — Gene Vinokur

(57) ABSTRACT

An unmanned aerial vehicle (UAV) agent for forming a two-tier hybrid smart agriculture network architecture is provided. The UAV agent is configured to support two communication protocols, a short-range communication protocol and a long-range communication protocol. The agriculture sensor gathers agriculture data such as soil temperature and participates in a first-tier short range wireless communication network to send the collected data to at least one UAV agent. A UAV agent participates in one or more first-tier short-range communication networks to pick up sensor data from agriculture sensors in one or more clusters and also participates in a second-tier long-range communication network to route the collected sensor data to at least one cloud server. The tasks in both tier networks are formulated as optimization problems to achieve optimal data delivery and solved by using multi-agent reinforcement learning (MARL), which is implemented by the invented Focus Coordination Multi-Agent Deep Deterministic Policy Gradient (FC-MADDPG) algorithm.

22 Claims, 12 Drawing Sheets

(51) Int. Cl.

| | |
|---|---|
| *G06N 7/01* | (2023.01) |
| *H04B 7/185* | (2006.01) |
| *H04W 4/44* | (2018.01) |
| *H04W 84/18* | (2009.01) |

(56) References Cited

U.S. PATENT DOCUMENTS

| | | | | |
|---|---|---|---|---|
| 10,255,670 | B1 * | 4/2019 | Wu | H04N 7/183 |
| 10,313,967 | B2 * | 6/2019 | Chandra | H04W 52/0258 |
| 10,356,187 | B2 * | 7/2019 | Chandra | H04L 67/5651 |
| 10,721,859 | B2 * | 7/2020 | Wu | A01C 21/007 |
| 10,785,719 | B2 * | 9/2020 | Chandra | H04W 52/0277 |
| 11,145,007 | B2 * | 10/2021 | Ruff | A01B 79/005 |
| 11,354,757 | B2 * | 6/2022 | Chiocco | G06Q 50/02 |
| 11,485,493 | B2 * | 11/2022 | Mahkonen | H04B 7/18504 |
| 11,552,857 | B2 * | 1/2023 | DeLay | G06N 3/088 |
| 11,587,186 | B2 * | 2/2023 | Ruff | A01B 79/005 |
| 11,854,094 | B2 * | 12/2023 | Chiocco | G05D 1/0094 |
| 12,002,115 | B2 * | 6/2024 | Bull | G06Q 10/06393 |
| 12,082,564 | B2 * | 9/2024 | Sinclair | B63B 79/10 |
| 12,278,409 | B2 * | 4/2025 | Kwon | A01G 9/246 |
| 12,494,137 | B1 * | 12/2025 | Ahmed | G06N 3/006 |
| 2014/0172194 | A1 * | 6/2014 | Levien | G08G 5/76 |
| | | | | 701/2 |
| 2016/0144959 | A1 * | 5/2016 | Meffert | B64U 10/13 |
| | | | | 701/3 |
| 2016/0214715 | A1 * | 7/2016 | Meffert | B64U 20/87 |
| 2017/0031365 | A1 * | 2/2017 | Sugumaran | G05D 1/0219 |
| 2018/0069933 | A1 * | 3/2018 | Chandra | H04L 67/52 |
| 2018/0072414 | A1 * | 3/2018 | Cantrell | B64U 10/13 |
| 2018/0262571 | A1 * | 9/2018 | Akhtar | H04L 67/12 |
| 2018/0302853 | A1 * | 10/2018 | Chandra | H04L 67/1095 |
| 2019/0007505 | A1 * | 1/2019 | Chandra | H04N 23/698 |
| 2019/0057461 | A1 * | 2/2019 | Ruff | G01N 33/24 |
| 2019/0150357 | A1 * | 5/2019 | Wu | H04N 23/51 |
| 2019/0210725 | A1 * | 7/2019 | Cantrell | B64U 10/13 |
| 2019/0230589 | A1 * | 7/2019 | Chandra | H04L 67/568 |
| 2021/0088337 | A1 * | 3/2021 | Koubaa | G05D 1/0022 |
| 2021/0244005 | A1 * | 8/2021 | Sinclair | A01G 33/00 |
| 2021/0256632 | A1 * | 8/2021 | Chiocco | G06Q 50/02 |
| 2021/0390633 | A1 * | 12/2021 | Ruff | G06Q 50/02 |
| 2022/0250108 | A1 * | 8/2022 | Ampatzidis | B05B 12/122 |
| 2022/0301080 | A1 * | 9/2022 | Catala Luque | G06N 3/0499 |
| 2022/0405865 | A1 * | 12/2022 | Chiocco | G06V 20/17 |
| 2023/0042523 | A1 * | 2/2023 | Kwon | A01G 9/246 |
| 2023/0206352 | A1 * | 6/2023 | Bull | G06Q 10/06393 |
| | | | | 705/7.39 |
| 2023/0297859 | A1 * | 9/2023 | Choi | B64C 39/024 |
| 2023/0375988 | A1 * | 11/2023 | Kastl | A01G 25/16 |
| 2025/0008934 | A1 * | 1/2025 | Sinclair | A01G 33/00 |
| 2025/0293968 | A1 * | 9/2025 | Guo | H04L 67/10 |
| 2026/0013432 | A1 * | 1/2026 | Clark | A01D 41/127 |
| 2026/0013434 | A1 * | 1/2026 | Clark | A01D 41/1273 |

OTHER PUBLICATIONS

Zhu et al., Joint Data Collection and Sensor Positioning in Multi-UAV-Assisted Wireless Sensor Network, Oct. 1, 2023, IEEE, IEEE Sensors Journal, vol. 23, No. 19, pp. 23664-23675, doi: 10.1109/JSEN.2023.3305348 (Year: 2023).*

Vladuta et al., Trajectory influence on data collection in Wireless Sensor Networks using an Unmanned Aerial Vehicle, 2018, 2018 10th International Conference on Electronics, Computers and Artificial Intelligence (ECAI), pp. 1-6, doi: 10.1109/ECAI.2018.8679047 (Year: 2018).*

Maddikunta et al., Unmanned Aerial Vehicles in Smart Agriculture: Applications, Requirements, and Challenges, Aug. 15, 2021, IEEE, IEEE Sensors Journal, vol. 21, No. 16, pp. 17608-17619 (Year: 2021).*

Sotheara et al., Effective data gathering and energy efficient communication protocol in Wireless Sensor Networks employing UAV, 2014, IEEE, 2014 IEEE Wireless Communications and Networking Conference (WCNC), pp. 2342-2347, doi: 10.1109/WCNC.2014.6952715 (Year: 2014).*

Xiong et al., UAV Aided Smart Agriculture Networks: A Multi-Agent Reinforcement Learning Approach, 2025, IEEE, ICC 2025—IEEE International Conference on Communications, pp. 3075-3081, doi: 10.1109/ICC52391.2025.11161267 (Year: 2025).*

Tao et al., High-Precision Crop Monitoring Through UAV-Aided Sensor Data Collection, 2024, ICC 2024—IEEE International Conference on Communications, pp. 3506-3511, doi: 10.1109/ICC51166.2024.10622745 (Year: 2024).*

X. Qiu, L. Xu, P. Wang, Y. Yang and Z. Liao, "A Data-Driven Packet Routing Algorithm for an Unmanned Aerial Vehicle Swarm: A Multi-Agent Reinforcement Learning Approach," in IEEE Wireless Communications Letters, vol. 11, No. 10, pp. 2160-2164, Oct. 2022, doi: 10.1109/LWC.2022.3195963.

Hasegawa, S.; Kitagawa, R.; Li, A.; Kim, S.-J.; Watanabe, Y.; Shoji, Y.; Hasegawa, M. Multi-Armed-Bandit Based Channel Selection Algorithm for Massive Heterogeneous Internet of Things Networks. Appl. Sci. 2022, 12, 7424. https://doi.org/10.3390/app12157424.

Kazim Ergun, Raid Ayoub, Pietro Mercati, Tajana Rosing, Reinforcement learning based reliability-aware routing in IoT networks, Ad Hoc Networks, vol. 132, 2022, 102869, ISSN 1570-8705, https://doi.org/10.1016/j.adhoc.2022.102869.

* cited by examiner

Short range communication link

---

Algorithm 1 FC-MADDPG

1: Initialization:
2: for each UAV agent $k$ in the mesh network do
3:     Initialize an actor network $\pi_k(\theta_k)$ with weights $\theta_k$ for policy representation, and a critic network $Q_k(\omega_k)$ with weights $\omega_k$ for value estimation;
4:     Copy the initial weights to target networks $\pi'_k(\theta'_k)$, $Q'_k(\omega'_k)$;
5:     Prepare a local replay buffer $B_k$;
6: end for
7: For each episode:
8:     Reset the environment and receive the initial observation for each agent; //Initial Observations
9: for each agent $k$ do
10:     Select action $A_k$ using actor network $\pi_k$ based on the current state;
11:         Apply actions, observe new state, rewards, and check episode end; //Environment Interaction
12:         Store transition tuple $$(\{O_j, j \in \mathcal{N}_k\}, A_k, r_k, \{O'_j, j \in \mathcal{N}_k\})$$

in $B_k$; //Storing Experiences
13:     Update critic $Q_k$ by minimizing the loss between predictions and target values;
14:     Update actor $\pi_k$ using the sampled policy gradient;
15:     Update target networks $\pi'_k$, $Q'_k$ with a mix of target and main network weights; //Target Networks Update
16: end for
17: End of Episode Handling:
18:     Reset the environment for the next episode if the terminal state is reached
19: Output:
20: A set of optimized policies for each UAV ensuring efficient routing and network performance

MULTI-AGENT REINFORCEMENT LEARNING AIDED SMART AGRICULTURE NETWORKS

FIELD OF THE INVENTION

This invention relates generally to a node device or method for transporting data over wireless communications networks, and particularly to transfer data from agriculture sensors to remote cloud servers without conventional communication infrastructure.

BACKGROUND OF THE INVENTION

In an era marked by burgeoning global population growth, the smart agricultural practices have become imperative. The Internet of Things (IoT) paradigm has been playing important roles in many urban applications such as smart utility and smart city. However, the application of IoT in agriculture is not well studied. In fact, IoT fits many use cases in agriculture including greenhouse automation, soil monitoring and predictive analytics for smart farming. IoT can bring many benefits to agriculture, e.g., using data for better decision making, risk reduction, cost management, business efficiency improvement and most importantly to realize smart agriculture.

Smart agriculture is mostly used to denote the application of IoT technologies in the agriculture. For example, by using smart agriculture sensors to monitor the state of crops, farms can determine exactly how much fertilizer and pesticide to use to reach optimal efficiency. However, realizing smart agriculture still faces the many challenges. (1) Lack of infrastructure is a major issue for smart farming. Farms need the infrastructure such as communication facility and data processing system to build architecture to realize smart farming. However, such infrastructure is not widely available. (2) Data transfer and data analysis present challenges. Farms rely on a sparsely distributed network of sensors to gather data. However, the sensors don't have enough resources to process data. Accordingly, the collected data must be delivered to a processing center such as a more powerful device or cloud server for processing and making use of it. (3) Agriculture sensors have limited memory to store a large amount of data. As a result, the collected data by sensors need to be transferred to avoid memory overflow. Without the necessary communication infrastructure, data transfer becomes another major issue. (4) In addition, even if communication infrastructure is built up, poor communication connectivity is another issue. The farms are typically located in remote areas where communication connectivity might not be strong enough to facilitate fast data transmission. Furthermore, communication links may be obstructed by crops and other physical barriers. The communication connectivity should be reliable enough to withstand bad weather conditions and to ensure non-disruptive operations. (5) The sensor cost is also a concern. The agriculture sensors are not massively manufactured. Specific agriculture sensors to be deployed depend on the types of information farms want to collect and the purpose of solution. The set of sensors to cover a farm could cost up to thousands of dollars. There are also other challenges. As a result, for smart agriculture to become a reality, there are many issues that need to be addressed. In summary, intelligent and economical agriculture sensors must be manufactured, data processing platform is imperative and as a bridge, communication network must be developed to connect sensor and platform.

Accordingly, smart agriculture technologies can be divided into four categories, (1) sensor technology, (2) networking technology and (3) platform technology. Sensor technology works on sensor capabilities such as what communication interface to be supported, how to collect data, when to collect data and what data to be collected. Networking technology focuses on how to communicate, when to communicate and how to organize sensors and communication infrastructure as a network to transfer sensor data to data processing centers such as cloud servers. Platform technology works on how to process data and obtain useful insights and make smart decisions since the data itself will be of little help if farms cannot make use of it.

For sensor technology, there are prior arts that are developing smart agriculture sensor technologies, e.g., SoilTech is a joint research project by several American universities to develop sensor systems capable of in-situ and remote measurement of dynamic variables in managed and unmanaged soils.

In terms of platform technology, there are also prior arts that are developing the platform technologies, e.g., to overcome poor communication connectivity challenge, Microsoft FarmBeats makes use of vacant TV frequencies to transfer information.

However, the networking technology as a bridge between sensor and platform is less studied due to the lack of communication infrastructure. The agriculture network infrastructure is not widely available yet. Therefore, the networking technology development must consider this factor. It is impractical to connect agriculture sensors using wires. As a result, sensors use wireless communication interface for communications. There are different types of wireless communication technologies available, e.g., LTE/5G and LoRa are long range wireless communication technologies. However, it is expensive for agriculture sensors to use LTE/5G technology in the licensed frequency band. LoRa can operate in the unlicensed frequency band, but it is not standardized technology and has very low data transmission rate. In addition, the unmanaged channel access can cause severe interference. Therefore, the practical communication technologies are short range communication protocols desired to operate in the unlicensed frequency band such as IEEE 802.11 (Wi-Fi) and IEEE 802.15.4 (Wi-SUN). The maximum communication range for these short-range communication protocols is 1 km, which is not enough for agriculture sensors to send data to the remote data processing center. Therefore, a delivery network is required. However, the communication infrastructure for agriculture sensors deployed in rural areas is not available yet. Therefore, it is desirable to develop an innovative solution.

Accordingly, it is desirable to provide a practical network architecture to build up smart agriculture systems to transfer agriculture sensor data to data processing center for processing and obtaining useful insights for farms to make the best decision.

SUMMARY OF THE INVENTION

Some embodiments of the present invention provide a two-tier hybrid network architecture to realize smart agriculture, in which no conventional communication infrastructure is needed. The provided agriculture network architecture consists of stationary agriculture sensors, unmanned aerial vehicles (UAVs) and cloud servers, wherein the UAVs are used to take the role of the conventional communication infrastructure to deliver data from agriculture sensors to cloud servers. To that end, the agriculture sensors and UAVs form the first-tier networks to transfer sensor data from sensors to UAVs. UAVs and cloud server form the second-tier network to route sensor data from UAVs to cloud server. The agriculture sensors and UAVs communicate using a short-range communication protocol. On the other hand, UAVs and cloud servers communicate using a long-range communication protocol. The multi-agent reinforcement learning (MARL) technologies are provided in such agriculture network architecture to make optimal sensor data delivery. In the provided agriculture network architecture, the UAVs are configured to work collaboratively. To save energy, UAVs operate only when data transfer is needed.

In some cases, the agriculture sensors can form smart agriculture networks, where the agriculture sensors are used to monitor various environmental and soil conditions, enabling farmers to optimize crop production, reduce waste, and make informed decisions. These networks consist of a wide range of sensors, each designed to measure specific data. There are different types of agriculture sensors including soil moisture sensors, temperature and humidity sensors, pH sensors, electrical conductivity (EC) sensors, nutrient sensors, CO2 sensors, light sensors, and weather stations. Each of the sensors can be configured to communicate its readings through signals, which can be analog or digital. Analog sensors produce a continuous electrical signal that directly correlates with the measured data, while digital sensors convert the measurement into a digital signal, often using protocols that may be I2C, SPI, or wireless communication technologies such as IEEE 802.11, IEEE 802.15.4, LoRa, or LTE/5G for data transmission across the agricultural sensor network. Integrating these sensors into a cohesive agriculture network allows for the collection and analysis of data in real-time or near-real-time, facilitating precision agriculture practices that can lead to more sustainable and productive farming operations.

For instance, soil moisture sensors are configured to measure the water content in the soil to help manage irrigation more efficiently. These sensors can use capacitance or resistance to measure moisture levels, sending electrical signals that correlate with the amount of moisture present. Temperature and humidity sensors are configured to monitor air and soil temperature as well as air humidity levels. These conditions affect plant growth and disease development. The sensors often use thermistors or digital signal outputs for temperature and capacitive elements for humidity. pH sensors are configured to measure the acidity or alkalinity of the soil, which is crucial for nutrient availability to plants. pH sensors typically use a potentiometric method, generating a voltage that varies with the pH level. Electrical conductivity (EC) sensors are configured to assess soil salinity, which can influence plant growth and water uptake. These sensors use electrodes to measure the electrical conductivity of the soil, indicating salt concentration. Nutrient sensors are configured to detect levels of specific nutrients like nitrogen, phosphorus, and potassium in the soil. These sensors can use various methods, including ion-selective electrodes, to produce a voltage or current change in response to the concentration of a particular nutrient. CO2 sensors are configured to measure the concentration of carbon dioxide in the greenhouse or field environment. High levels of CO2 can promote plant growth. These sensors typically use infrared gas analyzers or chemical sensors, translating the CO2 concentration into an electrical signal. Light sensors (e.g. Photosynthetically Active Radiation Sensors) are configured to measure the light intensity available for photosynthesis. They can detect wavelengths of light that plants use for growth, often using photodiodes or phototransistors that convert light into an electrical signal. Weather stations are not a single sensor, weather stations integrate multiple sensing elements to monitor weather conditions like wind speed and direction, rainfall, solar radiation, and atmospheric pressure. These stations use a variety of sensing technologies to collect data, which is then used to make informed decisions about planting, irrigation, and harvesting.

Some embodiments of the invention are based on recognition that the IoT technologies have been playing important role in many urban applications such as smart utility, smart city, infrastructure monitoring and smart building. However, the application of IoT technology in rural agriculture is not well studied. IoT can bring many benefits to agriculture to realize smart agriculture. Accordingly, practical IoT technologies need to be developed to make smart agriculture a reality.

Some embodiments of the invention are based on recognition that the smart agriculture technologies can be divided into three categories, (1) sensor technology, (2) networking technology and (3) platform technology. There are prior arts that are developing sensor technologies and platform technologies. However, networking technology is less studied, which is a key bridge to connect agriculture sensors and cloud servers. Therefore, it is desirable to develop the IoT network technologies to realize smart agriculture.

To that end, one object of various embodiments of the invention is to design a two-tier hybrid agriculture network architecture using agriculture sensors, UAVs and cloud servers, wherein agriculture sensors and UAVs form the first-tier networks and UAVs and cloud servers form the second-tier network, wherein the UAVs are used to take the role of conventional communication infrastructure and support two communication protocols, a short-range communication protocol such as IEEE 802.11 or IEEE 802.15.4 used by agriculture sensors and a long-range communication protocol such as LTE/5G used by cloud server, wherein the agriculture sensors communicate with UAVs using short-range communication protocol to transfer sensor data from agriculture sensors to UAVs in the first-tier communication networks, wherein UAVs and cloud servers communicate using long-range communication protocol to route received data from UAVs to cloud servers in the second-tier communication network.

Some embodiments of the invention are based on recognition that agriculture sensors are sparsely deployed in agriculture areas. Depending on application purpose, some type of sensors may be deployed underground, some type of sensors may be deployed on the ground and some type of sensors may be deployed over ground. Therefore, there are different ways to cluster sensors including location based clustering, sensor type based clustering and communication connectivity based clustering.

Accordingly, some embodiments of the invention cluster the agriculture sensors based on geometric locations and communication connectivity such that the sensors in same cluster can form a connected communication network, wherein one or more UAVs can be assigned to collect sensor data from a cluster at a given time interval.

Some embodiments of the invention are based on recognition that a farm may deploy different types of sensors to gather different data. As a result, when to collect data, what data to collect and how much data to collect may be different. The different sensors may gather data in different ways, some sensors may collect data randomly, some sensors may collect data periodically. Accordingly, some agriculture sensors may have more data and some agriculture sensors may have less data.

To that end, some embodiments of the invention consider agriculture sensor data collection as a random process such that each agriculture sensor gathers data accordingly a probability distribution.

Some embodiments of the invention are based on recognition that agriculture sensors have small memory to store data gathered. Accordingly, agriculture sensor data must be picked up in time by UAVs to avoid memory overflow data loss.

To that end, some embodiments of the invention model data pick up as a first Markov Decision Process (MDP) problem, wherein the state is buffer size of agriculture sensor (the number of data packets stored), action is data packet pick up and cost (the reward) is data packet pick up latency.

Some embodiments of the invention are based on recognition that a UAV has a capacity in both communication capability and storage limitation such that it can only pick up a limited number of data packets from an agriculture sensor cluster at a given time interval.

To that end, the data packets in an agriculture sensor cluster must be efficiently picked up to avoid data packet discard due to memory overflow. Accordingly, some embodiments of the invention formulate the first MDP problem to find an optimal pickup policy that minimizes the average latency to avoid memory overflow. The existing relative value iteration method can be applied to solve the first MDP problem.

Some embodiments of the invention are based on recognition that UAVs have buffer limitation and energy supply constraint. As a result, efficient data delivery and energy saving are critical. Therefore, it is impractical for a UAV to travel to remote cloud server to offload the collected sensor data. Accordingly, a cooperative data delivery approach is needed.

Some embodiments of the invention are based on recognition that long-range communication protocols can support peer-to-peer (P2P) without assistance of the infrastructure, e.g., LTE/5G protocols are enabling the device-to-device (D2D) communications, which allows LTE/5G devices to communicate directly without base station.

Accordingly, some embodiments of the invention form the second-tier network as a dynamic multi-hop mesh network consisting of UAVs and cloud servers for cooperative data delivery, wherein UAVs and cloud servers dynamically form a mesh network by using long-range communication protocol while UAVs are picking up sensor data from agriculture sensors in the first-tier networks using short-range communication protocol. Using the formed mesh network, UAVs deliver the collected sensor data to cloud servers in a dynamically formed multi-hop second-tier network.

Some embodiments of the invention are based on recognition that for UAVs to route data to cloud servers in a mesh topology, a routing policy is needed. Accordingly, a second Markov Decision Process (MDP) problem is formulated based on states of the UAVs in the second-tier UAV mesh network, wherein the state of an UAV includes the number of packets in UAV's buffer and the hop observed, the action of an UAV is to select a neighbor and send data packet to the selected neighbor, wherein the action space for an UAV is the set of neighbors.

Accordingly, some embodiments of the invention formulate the second MDP problem to minimize data delivery latency without buffer overflow. Instead of using a stationary routing protocol, some embodiments of the invention solve the second MDP problem using multi-agent reinforcement learning (MARL) in which each UAV acts as a learning agent.

To that end, a Focus Coordination Multi-Agent Deep Deterministic Policy Gradient (FC-MADDPG) algorithm is provided to implement the MARL for solving the second MDP problem, wherein the FC-MADDPG algorithm is a semi-cooperative approach such that learning agents share information with their neighbors only. Accordingly, each agent trains machine learning models using its information and neighbor information and makes decentralized action decisions.

According to an embodiment of the present invention, an unmanned aerial vehicle (UAV) agent is provided for delivering data packets from agriculture sensors deployed in agriculture fields to at least one cloud server via a two-tier hybrid network architecture consisting of at least one first-tier network and a second-tier network, wherein the at least one first-tier network is formed by agriculture sensor clusters of the agriculture sensors and at least one UAV agent via the first links, the second-tier network is formed by the UAV agents and at least one cloud server via the second links. The UAV agent may include a first transceiver configured to receive data packets from agriculture sensors via the first links; a second transceiver configured to receive data packets from neighboring UAV agents and route the received data packets to at least one cloud server via the second links; a memory configured to store geographical locations and the first links corresponding to the agriculture sensors, the second links corresponding to neighboring UAV agents or at least one cloud server, a number of agriculture sensors in the corresponding agriculture sensor clusters, computer executable programs including a Focus Coordination Multi-Agent Deep Deterministic Policy Gradient (FC-MADDPG) algorithm; a processor configured to perform steps of the computer executable programs, wherein the steps comprise: receiving the data packets in each time interval during data collection process from selected agriculture sensors storing the data packets, using the first transceiver via the first links of the at least one first-tier network, wherein the data collection process is performed by solving a first Markov Decision Process (MDP) problem formulated based on a state of the UAV agent and states of the agriculture sensors; learning routes to the at least one cloud server, using the second transceiver via the second links of the second-tier network, by solving a second MDP problem formulated based on states of UAV agents, wherein the second MDP problem is solved by using multi-agent reinforcement learning (MARL), wherein a FC-MADDPG algorithm is provided to implement the MARL; wherein the execution of the FC-MADDPG algorithm outputs the route for each UAV agent, the learned routes are used to route the received data packets from UAV agents, using the second transceiver via the second links of the second-tier network, to the at least one cloud server.

Moreover, based on some embodiments of the present invention, a two-tier hybrid network architecture is provided. In this case, the two-tier hybrid network architecture may include a plurality of agriculture sensors configured to collect measurements, store and transmit data packets of the measurements, wherein the agriculture sensors are deployed in agriculture fields; a plurality of unmanned aerial vehicle (UAV) agents, wherein each of the UAV agents is configured, in communication with one or more agriculture sensors, to form at least one first-tier network with the agriculture sensors for receiving, storing, and transmitting the data packets collected by the agriculture sensors; at least one cloud server in communication with the at least one UAV agent, forming a second-tier network, wherein the second-tier network is configured to route the data packet to the at least one cloud server from the UAV agents; wherein the at least one first-tier network is formed by agriculture sensor clusters of the agriculture sensors and the at least one UAV agent among the UAV agents via first links, wherein the second-tier network is formed by the UAV agents and the at least one cloud server via second links, wherein each of the UAV agents comprises: a first transceiver configured to receive the data packets from agriculture sensors via the first links; a second transceiver configured to receive the data packets from neighboring UAV agents and route the received data packets to the at least one cloud server via the second links; a memory configured to store geographical locations and the first links corresponding to the agriculture sensors, the second links corresponding to the neighboring UAV agents or at least one cloud server, a number of agriculture sensors in the corresponding agriculture sensor clusters, computer executable programs including a Focus Coordination Multi-Agent Deep Deterministic Policy Gradient (FC-MADDPG) algorithm; a processor configured to perform steps of the computer executable programs, wherein the steps comprise: receiving the data packets in each time interval during data collection process from selected agriculture sensors storing the data packets, using the first transceiver via the first links of the at least one first-tier network, wherein the data collection process is performed by solving a first Markov Decision Process (MDP) problem formulated based on states of the agriculture sensors; learning routes to the at least one cloud server, using the second transceiver via the second links of the second-tier network, by solving a second MDP problem formulated based on states of UAV agents, wherein the formulated second MDP problem is solved by using multi-agent reinforcement learning (MARL), wherein a FC-MADDPG algorithm is provided to implement the MARL, wherein the execution of the FC-MADDPG algorithm outputs the route for each UAV agent; and routing the received data packets, using the second transceiver via the second links of the second-tier network, to the at least one cloud server based on the learned routes.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 5 shows the provided Focus Coordination Multi-Agent Deep Deterministic Policy Gradient (FC-MADDPG) algorithm, wherein the FC-MADDPG algorithm is an implementation of multi-agent reinforcement learning (MARL), according to some embodiments of the present invention;

Figure 1:
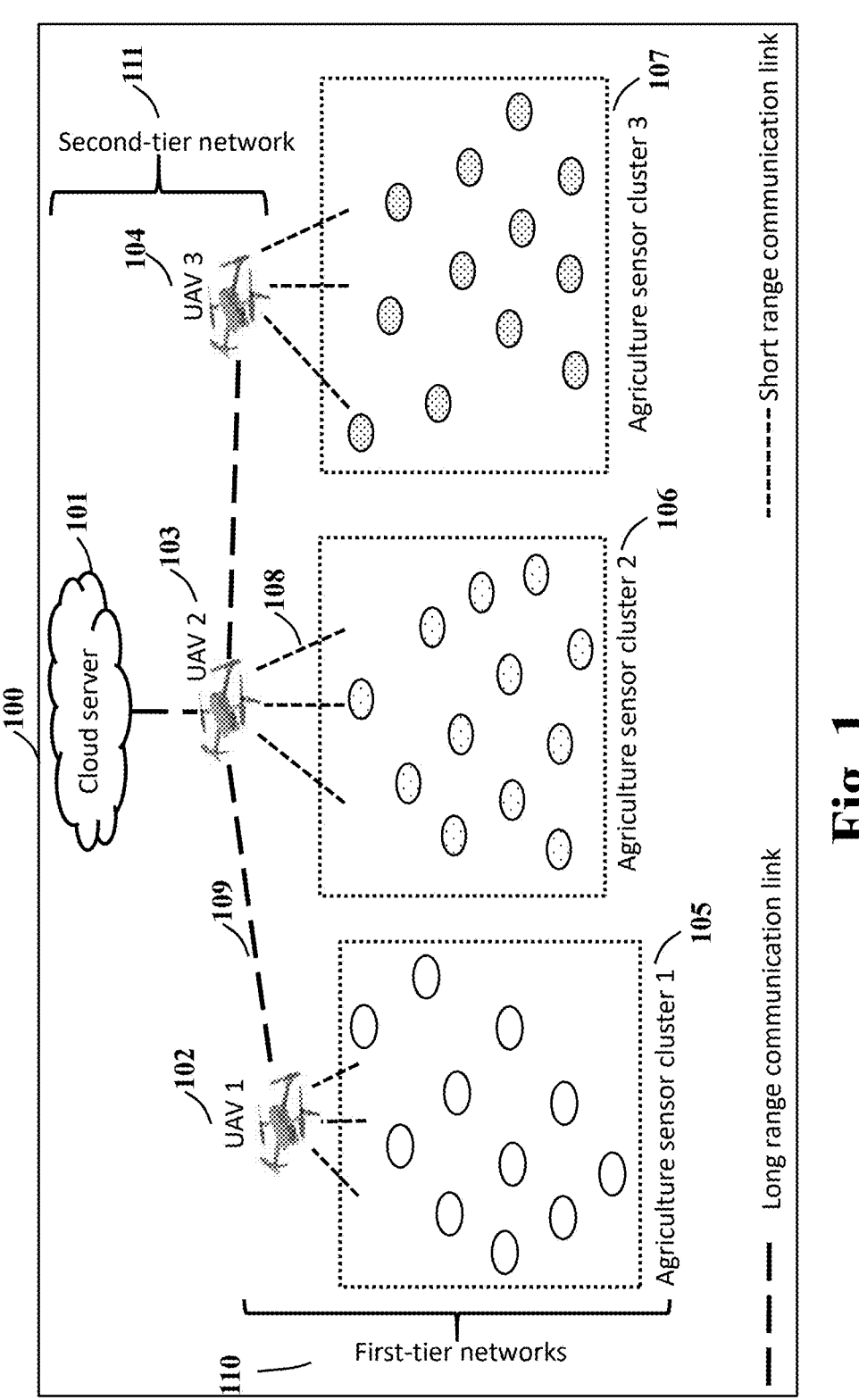
FIG. 1 is a schematic illustrating a two-tier hybrid agriculture network architecture with three clusters of agriculture sensors, three UAVs and one cloud server, wherein three first-tier networks are accordingly formed by three clusters of agriculture sensors and three assigned UAVs, wherein a second-tier network is formed by three UAVs and the cloud server, according to some embodiments of the present invention.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION OF THE PREFERRED EMBODIMENTS

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

In an era marked by burgeoning global population growth, sustainable and efficient agricultural practices have become imperative. The Internet of Things (IoT) paradigm has been playing important roles in many urban applications such as smart meter and smart city. Many use cases in agriculture industry fit IoT including soil and crop monitoring, green house automation and predictive analytic for smart farming. IoT can bring many benefits to agriculture, e.g., using data for better decision making, risk reduction, cost management and business efficiency improvement. However, the realization of smart agriculture faces challenges as well. (1) Lack of communication infrastructure is a major issue for smart farming. Agriculture sensors are typically equipped with short range communication radio operating in the unlicensed frequency band for cost consideration, which indicates that these sensors may not be able to directly communicate with remote cloud servers. Accordingly, communication relay is needed. (2) Poor communication connectivity is another issue. Farmers rely on a sparsely distributed network of sensors to gather data. Due to the limitation of sensor resources, the collected data may need to be delivered to remote data centers for processing and making use of it. To that end, the communication links should be reliable enough to withstand bad weather conditions and to ensure non-disruptive operations. However, most farms are in remote rural areas where communication connectivity might not be strong enough to facilitate fast data transmission. Furthermore, communication links may be obstructed by crops and other physical barriers. Efficient sensor data transmission scheduling presents another challenge. (3) Sensors don't have a big memory to store a large amount of data. Therefore, data need to be promptly transferred. In other words, how to schedule data transmission to avoid data loss due to buffer overflow and reduce data delivery latency become critical. There are prior arts developing smart agriculture sensor technologies. The SoilTech is a joint research project by several American Universities to develop sensor systems capable of in-situ and remote measurement of dynamic variables in managed and unmanaged soils. There are also prior arts developing platform technologies. To overcome poor communication connectivity challenge, Microsoft FarmBeats aims to use vacant TV frequencies to transfer data.

However, the networking technology as a bridge between sensor and platform is less investigated due to the lack of conventional communication infrastructure. The agriculture network infrastructure is not widely available yet. Therefore, the networking technology development must consider this factor. It is impractical to connect agriculture sensors using wires. As a result, sensors use wireless communication interface for communications. There are different types of wireless communication technologies available, e.g., LTE/5G and LoRa are long range wireless communication technologies. However, it is expensive for agriculture sensors to use LTE/5G technology in the licensed frequency band. LoRa can operate in the unlicensed frequency band, but it is not standardized technology and has very low data transmission rate. In addition, the unmanaged channel access can cause severe interference. Therefore, the practical communication technologies are short range communication protocols desired to operate in the unlicensed frequency band such as IEEE 802.11 (Wi-Fi) and IEEE 802.15.4 (Wi-SUN). The maximum communication range for these short-range communication protocols is 1 km, which is not enough for rural agriculture sensors to send data to the remote data processing center. Therefore, a delivery network is required.

Due to the lack of conventional communication infrastructure, an innovative approach is needed.

The present invention applies the promising capabilities of IoT paradigm in revolutionizing smart agriculture, a pivotal aspect of contemporary farming techniques. To tackle the lack of conventional communication infrastructure and the inefficient data transfer due to unstable wireless connections, a novel smart agriculture architecture that utilizes the Unmanned Aerial Vehicles (UAVs) is provided. This UAV-aided agriculture network architecture can significantly enhance the reliability and efficiency of data transmission from agriculture sensors to cloud servers. In this architecture, UAVs take role of conventional communication infrastructure by forming a dynamic router network when agriculture sensor data need to be collected. In other words, for cost reduction, UAVs operate only when needed. However, this innovative approach brings forth its own set of challenges, notably in scheduling data transmission from agriculture sensors to UAVs, and in executing multi-hop routing from UAVs to remote cloud servers. According, the following technologies are provided to address issues:

1. An innovative UAV-aided dynamic two-tier hybrid smart agriculture network architecture is provided, in which the UAVs are employed to address the lack of feasible communication infrastructure issue in rural agriculture areas.
   a. UAVs and agriculture sensor clusters dynamically form the first-tier multi-point to point (MP2P) networks to transfer data from agriculture sensors to UAVs.
   b. UAVs and cloud servers dynamically form the second-tier mesh network to route data from UAVs to cloud servers.
2. The problem of scheduling data transmission from agriculture sensors to UAVs in the first-tier networks is formulated as a first Markov Decision Process (MDP) problem.
3. The problem of routing collected sensor data from UAVs to remote cloud servers in the second-tier network is formulated as a second MDP problem.
4. The multi-agent reinforcement learning (MARL) is applied to solve a second MDP problem in the second-tier network.
5. Accordingly, a Focus Coordination MADDPG (FC-MADDPG) algorithm is introduced to implement the MARL. This novel algorithm is designed to reduce communication overhead and mitigate vulnerabilities associated with centralized control algorithm, offering a decentralized and robust solution to the challenges of UAV-aided smart agriculture networks. It defines an innovative reward function, integrates an attention model to allow UAV agent to autonomously determine the relevance of information from neighboring agents and applies a Gumbel-Softmax method to approximate the gradient of discrete stochastic policies.

Reinforcement Learning and Preliminaries

Reinforcement Learning (RL) describes a process where an agent acquires knowledge through direct interactions with the environment for decision-making. In RL, the agent first perceives the current state of the environment. Based on this observation, it decides on what action to take. Following the action, the environment responds, which in turn leads to the agent receiving feedback in the form of a reward. The fundamental aim of RL is for the agent to develop a policy that effectively maximizes the total expected reward over time.

The Elements of Markov Decision Process (MDP)

The fundamental model of RL problems is the Markov Decision Process (MDP), which provides a mathematical framework for modeling decision-making in situations where outcomes are uncertain and possibly influenced by the actions of a decision maker. MDPs are particularly useful for decision-making in systems that can be modeled as a tuple $\langle \mathcal{S}, \mathcal{A}, \mathcal{P}, \mathcal{R}, \gamma \rangle$: a finite set of states $\mathcal{S}$ where state $s_t \in \mathcal{S}$ represents the state of agent at time t, e.g., the number of stored data packets; a finite set of actions $\mathcal{A}$ where action $a_t \in \mathcal{A}$ represents the action of the agent at time t, e.g., transmitting a data packet or not; a state transition kernel $\mathcal{P}$: $\mathcal{S} \times \mathcal{A} \mapsto \mathcal{S}$ defines the probability of moving from one state to another given an action, i.e., P(s'|s, a)$= \mathbb{P}\, [s_{t+1}=s'|s_t=s,$ $a_t=a]$ represents the probability that the agent transits from state s to state s' under action a, e.g., if the current state is 10 packets, after transmitting one packet, next state is 9 packets; a reward function $\mathcal{R}: \mathcal{S} \times \mathcal{A} \mapsto \mathbb{R}$ where R(s, a) represents the expected reward (cost) if the agent takes action a at state s, e.g., for a successful packet transmission, receiving a +1 reward, for a unsuccessful packet transmission, receiving a −1 reward; and a discount factor $\gamma \in (0,1]$, which usually multiplies future rewards in order to dampen the effect of future rewards. For arbitrary policy $\pi$, the state-action value function $Q_\pi(s, a)$, i.e., the accumulated reward given the state-action pair under policy $\pi$, can be defined as follows $$Q_\pi(s, a) := \mathbb{E}_\pi \left[ \sum\nolimits_{t=0}^{\infty} \gamma^t R_r \,\middle|\, s_0 = s, a_0 = a \right], \tag{1}$$

with $\mathbb{E}_\pi$ being the expectation under policy $\pi$ and $R_t$ being the reward received at time step t. In RL, the goal of the agent is to find a policy $\pi: \mapsto \mathcal{S}\,\mathcal{A}$ to maximize the expected cumulative reward, which is equivalent to finding the optimal state-action value function $$Q*(s, a) = \max_\pi Q_\pi(s, a). \tag{2}$$

The optimal policy is the greedy policy where the agent chooses the action with the highest state-action value Q.

Reinforcement Learning Algorithms (1) Value-based methods: Value-based methods focus on estimating the value of each state $s \in \mathcal{S}$ or state-action pair $(s, a) \in \mathcal{S} \times \mathcal{A}$ in the environment. The most common approach is to learn a value function $V_\pi(s)$ or $Q_\pi(s, a)$ that predicts the expected return (cumulative reward) from a given state or state-action pair. Key algorithms in this category include Q-learning and Deep Q-Networks (DQNs). These methods often use a technique called Temporal Difference (TD) learning for updating the value estimates. The primary goal here is to maximize the value function, which indirectly learns the optimal policy w that satisfies the Bellman equation as $$Q_\pi(s, a) = R(s, a) + \gamma \sum\nolimits_{S'} P(s' \mid s, a) \max_{a'} Q_\pi(s', a'). \tag{3}$$

(2) Policy gradient-based methods: In contrast to value-based methods, policy gradient methods aim to optimize the policy $\pi(a|s; \theta)$ directly, where $\theta$ represents the parameters of the policy. The objective is to maximize the expected return $J(\theta) = \mathbb{E}_\pi[U]$, where $$U = \sum\nolimits_{t=0}^{\infty} \gamma^t R_t$$

is the cumulative reward. These methods adjust the policy by computing gradients that indicate how to change the policy parameters to increase expected returns, with the gradient of $J(\theta)$ with respect to $\theta$ is given by $$\nabla_\theta J(\theta) = \mathbb{E}_\pi[\nabla_\theta \log \pi(a \mid s; \theta) Q_\pi(s, a)]. \tag{4}$$

This gradient is used to update the policy parameters in the direction of higher expected rewards. A well-known example is the REINFORCE algorithm, which uses Monte Carlo methods for estimating the policy gradient. Other advanced techniques include Trust Region Policy Optimization (TRPO) and Proximal Policy Optimization (PPO), which improve stability and efficiency of training. These methods are especially useful in high-dimensional or continuous action spaces.

(3) Actor-Critic based methods: Actor-critic methods combine elements from both value-based and policy gradient methods. The "actor" is a policy network that decides the best action to take, denoted as a policy function $\pi(a|s, \theta)$, while the "critic" is a value network that evaluates the action taken by the actor, denoted as $V_\pi(s; \omega)$ or $Q_\pi(s, a; \omega)$, with $\omega$ being parameters of the critic. The critic estimates the value function, which is used to update the policy (actor) more efficiently. The actor updates its policy parameters $\theta$ based on the gradient $$\nabla_\theta J(\theta) = \mathbb{E}_\pi[\nabla_\theta \log \pi(a \mid s; \theta) A_\pi(s, a; \omega)], \tag{5}$$

where $A_\pi(s, a; \omega)$ is the advantage function, often computed as $Q_\pi(s, a; \omega) - V_\pi(s; \omega)$. The critic's parameters) are typically updated based on the TD error or other value-based methods. Examples include Deep Deterministic Policy Gradient (DDPG) and Asynchronous Advantage Actor-Critic (A3C). These methods can stabilize the training process by using the critic's value estimate to reduce the variance in the policy gradient. They are effective in a variety of complex environments, balancing the strengths of both value-based and policy-based approaches.

C. Multi-Agent Reinforcement Learning (MARL)

RL can also be performed by multiple agents. Multi-Agent Reinforcement Learning (MARL) is a branch of RL that deals with environments where multiple agents interact with each other and the environment simultaneously. Unlike single-agent RL, where the focus is on learning an optimal policy for a single agent, MARL involves learning policies that are optimal in the context of other agents' policies and actions, with a partially observed environment. This makes the problem significantly more complex due to the dynamically changing environment caused by the agents' interactions. Multi-Agent DDPG is an extension of the DDPG algorithm to multi-agent settings. In the multi-agent version, each agent k has its own actor $\pi_k(a|s; \theta_k)$ network and critic $Q_k(s, a; \omega_k)$ network. The actor decides the best action to take given the current state, while the critic evaluates the action by estimating the Q-value. However, since each agent k can only have a local observation $o_k$ of the global state s of the environment with $s = U_k\, o_k$, agents might share information or learn collaboratively, depending on the specific implementation and problem setting. One common approach in Multi-Agent DDPG is the centralized training with decentralized execution. This means that during training, the critic has access to the actions and states of all agents, but during execution, each agent's actor-network operates independently based on its local observations $o_k$. In the Multi-Agent DDPG framework, each agent's critic estimates the value of state-action pairs, taking into account not only its own actions but also the actions of other agents. The policy parameters for agent k are denoted as $\theta_k$, and the policies for all agents are denoted as $\pi = \{\pi_k, \forall k\}$. The actions for all agents are denoted as $\mathcal{A} = \{a_k, \forall k\}$. The stochastic policy gradient for each agent can be expressed as:

$$\nabla_{\theta_k} J(\theta_k) = \mathbb{E}_s \left[ \nabla_{\theta_k} \log \pi_k(a_k \mid o_k; \theta_k) Q_i^\pi(s, \{a_k, \forall k\}) \right] \quad (6)$$

Here, $$Q_i^\pi(s, \{a_k, \forall k\})$$

represents the centralized action-value function that each agent's critic estimates, capturing the expected return of taking actions $\{a_k, \forall k\}$ in state s. The goal is to optimize the policy parameters $\theta_k$ to maximize the expected return by following the gradient of the expected return with respect to $\theta_k$. For DDPG, each agent k's actor optimizes their own policy $\pi_k$, and the deterministic gradient of the expected return with respect to the critic's parameters $\omega_k$ is given by:

$$\nabla_{\theta_k} J(\theta_k) = \mathbb{E}_{s \sim \mathcal{B}} \left[ \nabla_{\theta_k} \pi_k(o_k) \nabla_{a_i} Q_k^\pi(s, \{a_k, \forall k\}) \big|_{a_k = \pi_k(o_k)} \right], \quad (7)$$

where $\mathcal{B}$ is the replay buffer to store past experiences. Furthermore, to compute the critic's estimate of the value function, a target value function is used, which is the expected return of taking an action in the current state and following the target policy thereafter $$\mathcal{L}(\omega_k) = \mathbb{E}_{s,a,r,s'} \left[ (Q_k^\pi(s, \{a_k, \forall k\}) - y)^2 \right], \quad (8)$$

$$y = r_k + \gamma Q^{\pi'_i}(s', \{a'_k \cdot \forall k\}) \big|_{a'_k = \pi'_k(o_k)},$$

where $\pi'$ is the set of target policies for all agents, with $\pi' = (\pi'_1, \ldots, \pi'_N)$, which are used for calculating the target values to stabilize training.

Attention Mechanism

The attention mechanism in neural networks can be mathematically described using a few key components: query, key, value, and the attention function. These components work together to produce a weighted sum of values, where the weights assigned to each value depend on the compatibility of the query with the corresponding key. Given a sequence with m elements, the steps of the attention mechanism can be described as follows:

Vector Transformation: For each element i in the sequence, where i=1, . . . , m, the input vector $x^i$ is transformed into queries $q^i$, keys $u^i$, and values $v^i$:

$$q^i = W_q x^i \in \mathbb{R}^{d_q}, \quad (9)$$

$$u^i = W_u x^i \in \mathbb{R}^{d_u},$$

$$v^i = W_v x^i \in \mathbb{R}^{d_v}.$$

Attention Weights Calculation: The attention weights $\alpha^1, \ldots, \alpha^m$ are calculated for each element by comparing $q^i$ with all keys $u^1, \ldots, u^m$ in the sequence using the softmax function get a distribution of weights that sum to 1:

$$\alpha^i = \text{softmax}\left( (q^i)^T u^1, \ldots, (q^i)^T u^m \right), \quad (10)$$

where softmax is applied to the vector of raw attention scores to obtain normalized attention weights $\alpha^i, \forall i$.

Context Vector: The context vector $c^i$ for each element is computed as a weighted sum of all value vectors $v^1, \ldots, v^m$ with the weights given by $\alpha^i$:

$$c^i = \sum_{j=1}^{m} \alpha^{ij} v^j, \quad (11)$$

where $\alpha^{ij}$ is the weight from $\alpha^i$ corresponding to the j-th element in the sequence. The context vector $c^i, \forall i$ is a crucial output of the attention mechanism as it encapsulates the information from the input sequence that is most relevant to the element i. This process enables the model to focus selectively on different parts of the input when processing each element, analogous to how human attention focuses on different parts of a scene or a conversation.

Gumbel-Softmax Distribution

Gumbel-Softmax method is used to approximate the gradient of discrete distribution. Suppose a policy needs to take actions sampled from a policy distribution $\pi$ as $(a_1, \ldots, a_k)$. Here, each $a_i \in [0,1]$ and satisfies $$\sum_{i=1}^{k} a_i = 1.$$

The policy selection needs to approximate such a process with the non-differentiability of the discrete nature of the policy distribution. To sample from a categorical distribution with class probabilities $(a_1, \ldots, a_k)$, the Gumbel-Softmax distribution can be applied. To sample from a Gumbel(0, 1) distribution, the Gumbel(0, 1) distributed noise is first calculated as:

$$g_i = -\log(-\log(u)), u \sim \text{Uniform}(0, 1).$$

The Gumbel-Softmax sample is then given by:

$$y_i = \frac{\exp((\log(a_i) + g_i)/\tau)}{\sum_{j=1}^{k} \exp((\log(a_j) + g_j)/\tau)}, i = 1, \ldots, k.$$

where $\tau > 0$ is a temperature parameter that controls the smoothness of the approximation. As $\tau \rightarrow 0$, the samples from Gumbel-Softmax distribution become closer to one-hot vectors. Providing the Gumble-softmax sampling, the approximated discrete action is then obtained.

System Model

Some embodiments of the invention provide a two-tier hybrid smart agriculture network architecture, in which the first-tier networks are dynamically formed by agriculture sensor clusters and the assigned UAVs via a short-range communication protocol and the second-tier network is dynamically formed by all UAVs and cloud servers via a long-range communication protocol. FIG. 1 shows an example of the two-tier hybrid smart agriculture network architecture 100, which consists of a cloud server 101, three UAVs 102, 103, 104 and three agriculture sensor clusters 105, 106, 107. Each UAV and the corresponding sensor cluster form a first-tier network 110 using short-range communication link 108. As a result, three first-tier networks are formed. Three UAVs and cloud server form a second-tier network 111 using long-range communication link 109.

The second-tier network 111 is a UAV-aided relay network in a rural agricultural environment. The deployed agriculture sensors may not have direct communication links with the remote cloud servers since agriculture sensors are typically equipped with short-range communication radio. In addition, the conventional communication infrastructure may not be available in rural areas. Accordingly, the present invention uses UAVs as node agents in place of conventional communication infrastructure such as base stations in cellular communication network to relay the data from agriculture sensors to the remote cloud servers for sensor data processing. The UAVs are indexed by set $K=\{1, 2, \ldots, K\}$. Based on the geographical locations and communication links of the deployed agriculture sensors, overall sensors are divided into K clusters. Without loss of generality, each cluster consists of N sensors. During sensor data relay process, the k-th UAV hovers over the cluster k in a specific geographical region, collects data from sensors of cluster k and relays the collected data to the cloud servers. However, it is possible that some geographical regions being far away from the cloud servers, and thus the associated UAVs in those regions may not be able to communicate with the cloud servers or may not have reliable communication links with the cloud servers. This requires the UAVs to collaboratively relay the data to the cloud servers. Accordingly, the UAVs dynamically form a mesh network to relay the sensor data. The goal of each UAV is then to find an optimal multi-hop route to a cloud server.

There are two operations to relay data from agriculture sensors to the remote cloud servers: the first operation is to transfer data from sensors to UAVs and the second operation is to relay data from UAVs to cloud servers. The first operation is performed in the first-tier networks and the second operation is performed in the second-tier network. However, two operations can be performed simultaneously, i.e., UAVs relay collected data to cloud servers while collecting data from sensors.

Figure 2A:
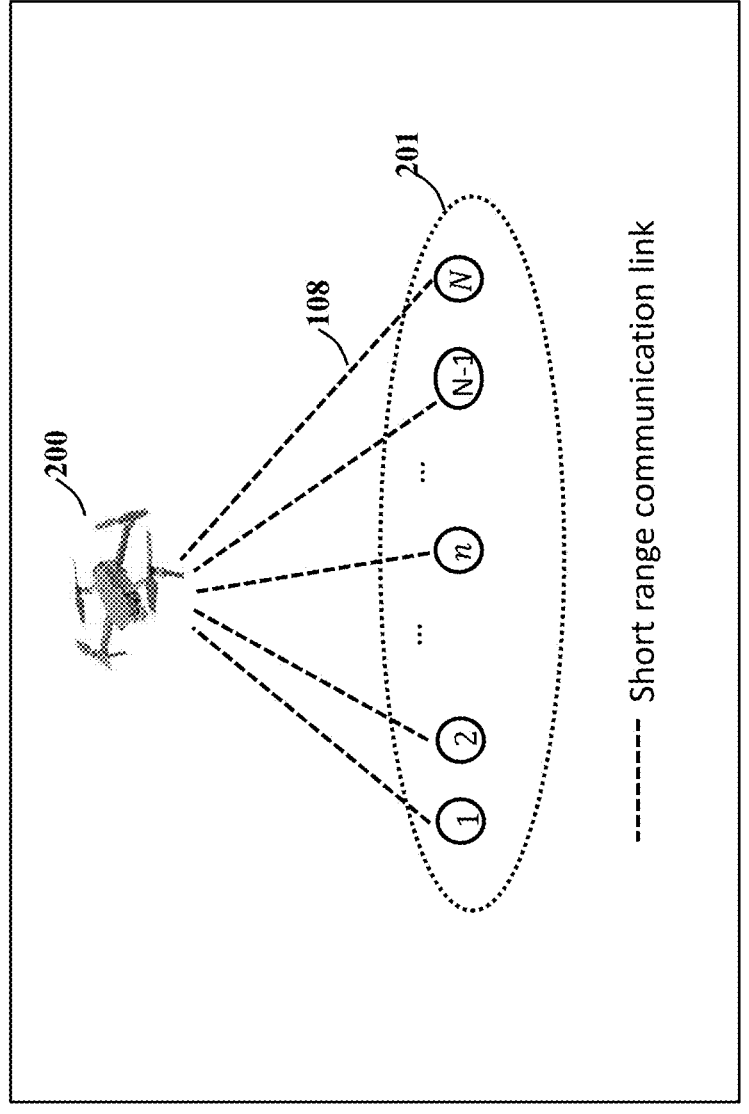
FIG. 2A shows an example of the first-tier network with one UAV and N agriculture sensors, according to some embodiments of the present invention.
Figures 2B, 2C:
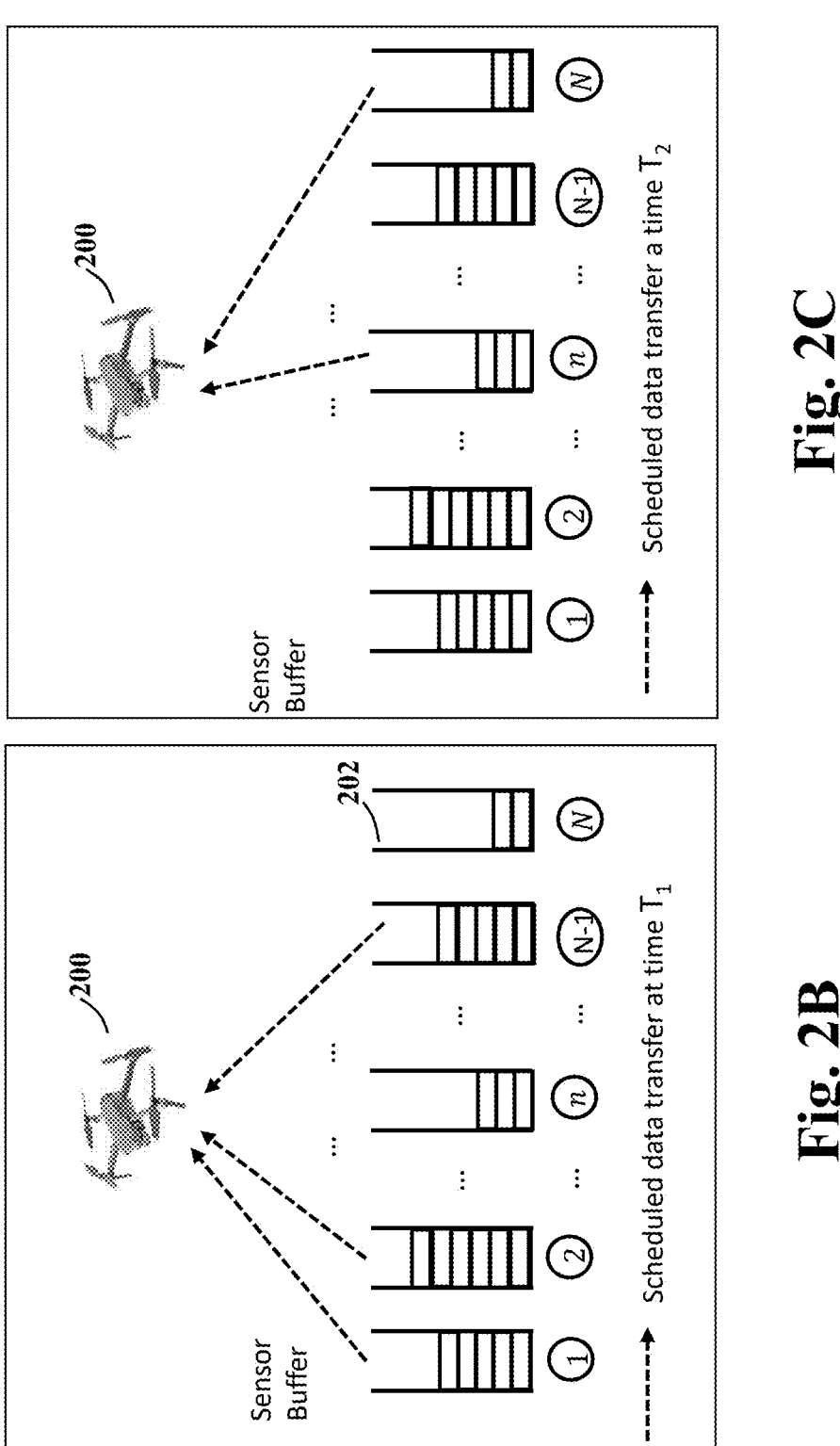
FIG. 2B shows an example of sensor data pick up in an agriculture sensor cluster by a UAV at a time $T_1$, according to some embodiments of the present invention.
FIG. 2C shows an example of sensor data pick up in same agriculture sensor cluster by same UAV at a time $T_2$, according to some embodiments of the present invention.
Figure 3:
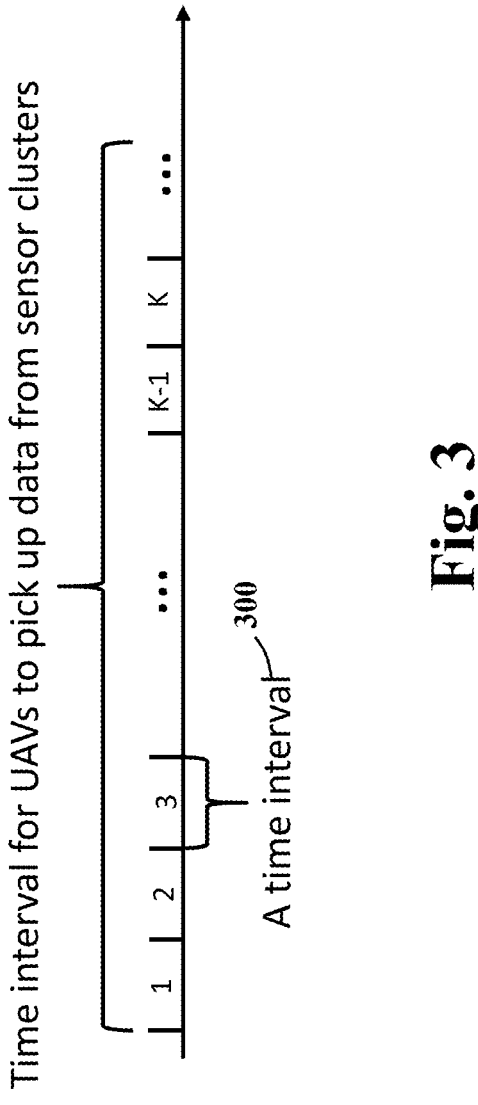
FIG. 3 depicts the time interval division for agriculture sensor data transfer, according to some embodiments of the present invention.

For the first operation, a UAV 200 is assigned to serve sensor cluster 201 consisting of N agriculture sensors as shown in FIG. 2A, where each sensor n measures agriculture data such as soil temperature probabilistically and independently according to a probability $p_n$. The UAV 200 collects data from sensor cluster 201 using short-range communication link 108. While a UAV with limited capacity C can only relay a composed data from a subset of sensors, where the capacity is an integrated factor considering both communication capability and storage limitation. FIG. 2B shows that UAV 200 collects data from sensors 1, 2, and N−1 at time $T_1$ and however, UAV 200 collects data from sensors n and N at time $T_2$ as shown in FIG. 2C. Accordingly, the time can be divided into time intervals 300 as shown in FIG. 3. The challenge is how to select C out of N sensors during each time interval to minimize the average latency. This optimization problem encompasses the need to efficiently allocate resources, consider probabilistic data generation, and prioritize real-time data delivery to address the critical objective of minimizing the average latency of agriculture sensor data relay.

Figure 4A:
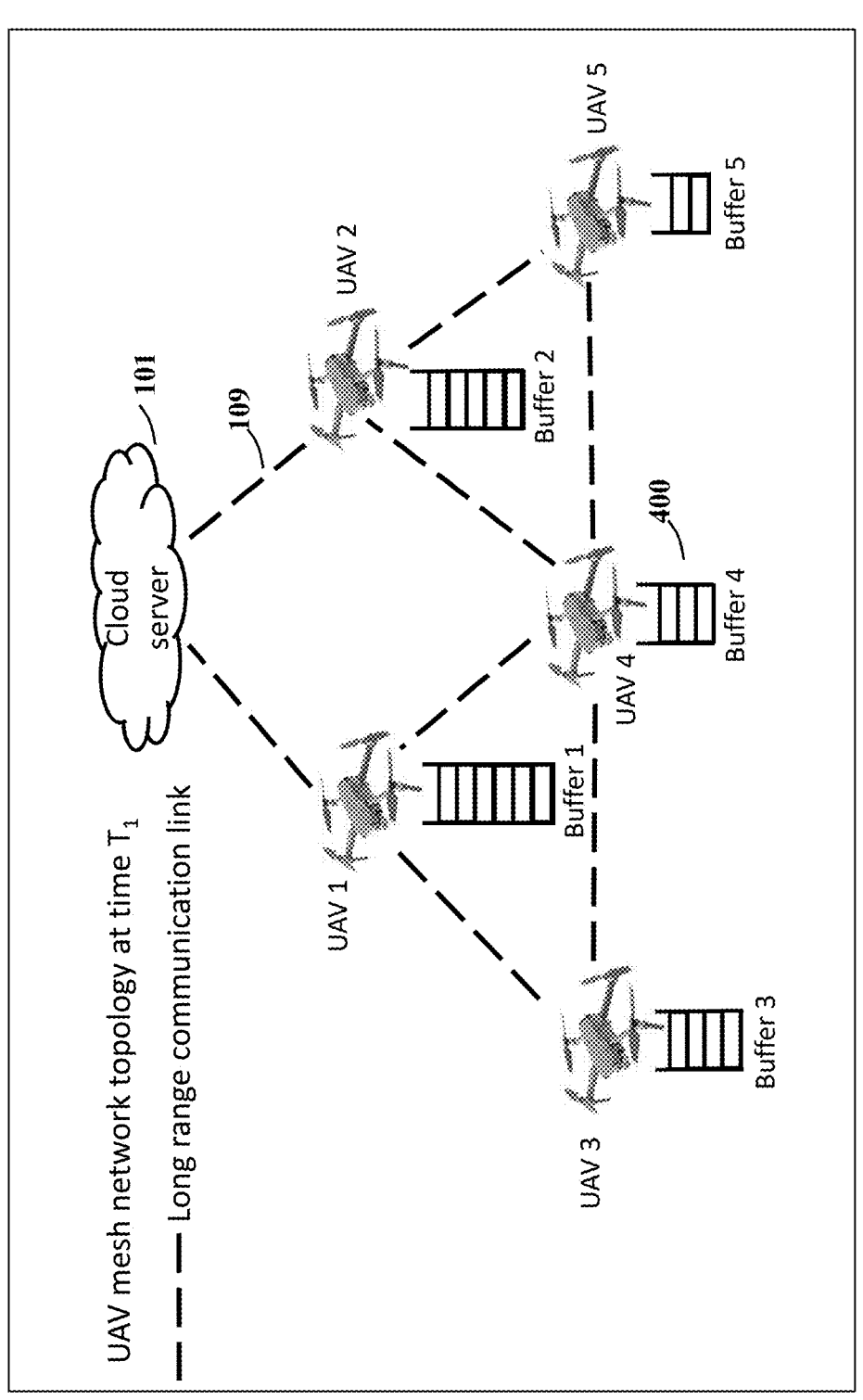
FIG. 4A illustrates an example of the second-tier network topology with five UAVs and one cloud server at time $T_1$, according to some embodiments of the present invention.
Figure 4B:
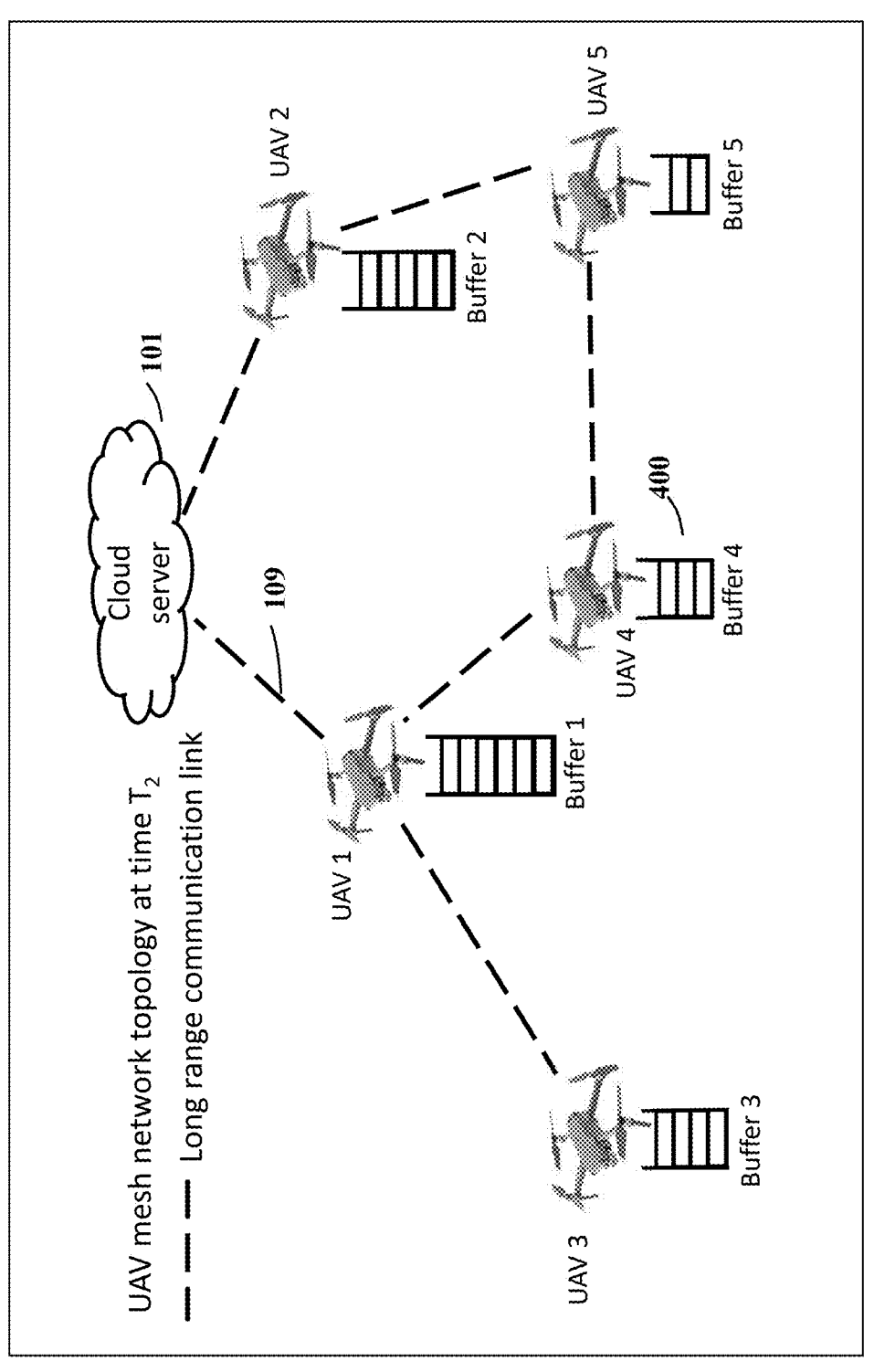
FIG. 4B illustrates an example of the second-tier topology network with same five UAVs and the cloud server at time $T_2$, according to some embodiments of the present invention.

For the second operation in the second-tier network, UAVs traverse over their respective cluster regions to collect data in T time intervals, leading to dynamic topology changes in the mesh network formed by the UAVs and cloud servers. To effectively manage data transmission in this dynamic environment, the development of dynamic routing techniques is imperative. The routing procedure directly impacts the determination of the UAV's capacity C for data packet scheduling during each time interval. Traditionally, route discovery is performed by protocol based methods. Recently, machine learning based routing techniques have been proposed and can outperform traditional routing methods in complex network environments. RL and Deep Learning (DL) methodologies can be harnessed to design and adapt routing techniques that efficiently allocate UAV resources and minimize latency, considering the evolving network topology and data generation probabilities. The UAVs and cloud servers form a dynamic second-tier network. FIG. 4A shows an illustrative example of the second-tier network topology formed by five UAVs and one cloud server 101 at time $T_1$, in which each UAV is associated with data buffer 400 and the long-range communication link 109 is used for communication. However, due to the dynamics of UAVs, the formed second-tier network topology is different for same set of UAVs and cloud server at time T2 as shown in in FIG. 4B. This dynamic mesh network framework offers the potential to optimize data transmission from VAVs to the cloud server 101, enhance resource utilization, and ensure timely and efficient data delivery in the ever-changing agriculture sensor networks.

Data Packet Transmission Problem Formulation in the First-Tier Sensor-to-UAV Networks Consider a first-tier agriculture network as shown in FIG. 2A, where the agriculture sensor cluster 201 consists of N agriculture sensors denoted as the set $\mathcal{N}=\{1, \ldots, N\}$ with $|\mathcal{N}|=N$. Agriculture sensors measure different data and generate different packets from the environment that need to be transmitted to the remote cloud server for processing. For ease of expression, it can be assumed that all data packets generated by sensors are of unit size. A UAV 200 with limited capacity can serve maximum C sensors in a time interval, where the capacity takes account of communication capability and storage limitation. The goal of the UAV 200 is to decide at each time interval which sensors to serve so that the cumulative value of the average packet delivery latency experienced by agriculture sensors is minimal.

Packet generation and delivery model: Time is divided into multiple units with each unit called an "interval", which is denoted by $t \in \mathcal{T}=\{1, \ldots, T\}$. The sensor $n \in \mathcal{N}$ generates the packet with probability $p_n$ at each time interval t. The data packets generated by sensor n are buffered in a queue, which stores the number of outstanding data packets generated by sensor n until time t as shown in FIG. 2A. The queue length associated with the number of such data packets at time t is denoted by $X_{n,t}$. The rationality of this model is that the number of generated data packets by sensor cluster 201 may be larger than the service capacity of the wireless UAV. Hence, the data packets generated by each agriculture sensor might not be served immediately so that there will be a latency associated with the agriculture sensor getting the generated data packets delivered to UAV 200. Another consideration is that the wireless channels between the UAV 200 and agriculture sensors are unreliable. It is a motivation to consider a queuing model that captures the latency experienced by agriculture sensors. Due to the unreliability of wireless channels, the data packet delivered from the agriculture sensor n to UAV 200 is a random event and a successful transmission occurs with probability qn.

Accordingly, the problem of data packet delivery for the above model is formulated as an MDP process (first MDP problem).

State: The state of the agriculture sensor cluster at time t is denoted as $X_t:=(X_{1,t}, \ldots, X_{N,t}) \in \mathbb{N}^N$, where $X_{n,t}$ is the number of outstanding data packets buffered at agriculture sensor $n \in \mathcal{N}$. To guarantee the stability of the Markov chain, it is assumed that $X_{n,t} \in [0, X_{max}]$, $\forall n$, t, where $X_{max}$ is queue capacity, i.e., the maximum number of packets can be buffered by agriculture sensors. The state-space associated with $X_t$ is denoted as $\chi$.

Action: At each time t, for each agriculture sensor n, the UAV must make a decision regarding whether or not to serve it. $U_{n,t}$ is used to denote the action taken for agriculture sensor n at time t, where $U_{n,t}=1$ indicates sensor n is served and $U_{n,t}=0$ indicates otherwise. Let $\mathcal{U}:=\{0,1\}$ be the set of decisions available for each action and let $U_t:=(U_{1,t}, \ldots, U_{N,t})$ be the vector consisting of decisions for N agriculture sensors. The capacity constraint of the communication link and the UAV storage implies that $U_t$ must satisfy the following constraints, $$\sum_{n=1}^N U_{n,t} \le C, \forall t. \tag{12}$$

The objective is to design a policy $\pi:\chi \mapsto \mathcal{U}^N$ maps the state $X_t$ of the sensor cluster to decisions $U_t$, i.e., $U_t=\pi(X_t)$.

Transition kernel: The state of the n-th agriculture sensor queue can change from $X_n$ to either $X_n+1$ or $X_n-1$ or keep unchanged from time t to t+1, depending on the action taken by the UAV and packet generation probability of agriculture sensor n. The detailed transitions are as follows $$X_{n,t+1} = \begin{cases} X_{n,t}+1, & w.p. \ p_n(1-U_{n,t})+p_nU_{n,t}(1-q_n), \\ X_{n,t}, & w.p. \ p_nU_{n,t}q_n+(1-p_n)(1-U_{n,t})+ \\ & \quad (1-p_n)U_{n,t}(1-q_n), \\ X_{n,t}-1, & w.p. \ (1-p_n)U_{n,t}q_n \end{cases} \tag{13}$$

It is straightforward to verify that the summation of the probability for three scenarios equals 1.

Data packet delivery problem: It follows from Little's Law that the objective of minimizing the average latency faced by agriculture sensors is equivalent to that of minimizing the average number of cumulative outstanding data packets in the sensor cluster. Let $C_{n,t}(X_{n,t}, U_{n,t}):=X_{n,t}$ be the instantaneous cost incurred by agriculture sensor n at time t, so that the cumulative cost incurred in the sensor cluster at time t is given by $$C_t(X_t, U_t) = \sum_{n=1}^N C_{n,t}(X_{n,t}, U_{n,t}) = \sum_{n=1}^N X_{n,t}. \tag{14}$$

With this choice of instantaneous cost, the average cost incurred in the system is proportional to the average latency faced by the agriculture sensors. The objective is to derive a policy $\pi$ for solving the following MDP:

$$\min_{\pi \in \Pi} C_\pi := \limsup_{T \to \infty} \sum_{n=1}^N \frac{1}{T} \mathbb{E}_\pi \left[ \sum_{t=0}^T X_{n,t} \right], \tag{15}$$

$$s.t. \sum_{n=1}^N U_{n,t} \le C, \forall t,$$

where the subscript denotes the fact that the expectation is taken with respect to the measurement induced by the policy $\pi$, and $\Pi$ is the set of all feasible policies. Henceforth, the problem (15) is referred as the "original MDP." Since it is an infinite-horizon average-cost problem, it can be solved via the existing relative value iteration approach.

Data Packet Routing Problem Formulation in the Second-Tier UAV Mesh Network

FIG. 4A shows an example of the second-tier UAV mesh network in which long-range communication link 109 is used for communication. The UAV mesh network can be structured as an undirected graph $\mathcal{G}=(\mathcal{K}, \varepsilon)$, where $\mathcal{K}=\{1, 2, \ldots, K\}$ is the set of nodes and $\varepsilon$ is the set of links. A node can be a UAV node or cloud server node. A link (i, j) exists between node i and node j only if node i and node j can directly communicate with each other. Denote as $\mathcal{N}_i:=\{j|$ (i,j) exists$\}$ the set of neighboring nodes of node i. These links are bidirectional in data routing, while the connections between the UAVs and the cloud servers are one-directional, indicating no sensor data flow from cloud servers to UAVs. This distinction in link directionality is crucial for routing and data packet transmission paths. In this network, data packets are delivered to the cloud servers through a series of relay routers (UAVs). This process is known as multi-hop routing. In particular, each UAV maintains a queue to store the data packets collected from the agriculture sensors in the associated cluster and the data packets received from neighboring UAVs. The UAVs manage their data packets based on the First-In First-Out (FIFO) criterion. This means that packets are processed in the order they are received, ensuring a fair and orderly handling of data without prioritization of certain packets over others.

The goal of each UAV k is to find a routing policy $\pi_k$ to minimize the average latency, i.e., maximize the expected accumulated reward RL perspective. Similarly, this routing problem can be formulated as another MDP process (second MDP problem).

States: Denote the state of the UAV mesh network at time t as $S_t:=(S_{1,t}, \ldots, S_{K,t}) \in \mathbb{N}^K$, where $S_{k,t}$ is the state for UAV $k \in \mathcal{K}$, representing the length of the queue, i.e., the number of stored data packets, and the hop observed (HO). To do so, a UAV sets HO=1 if the cloud server is its neighbor. Otherwise, the UAV sets HO=1+the minimal HO. The HO provides UAV a reference for next-hop router selection. Since each UAV has limited storage, let $S_{max}$ be the maximum queue length.

Observation space: It is impractical to share the states across the mech network due to communication overhead and computational complexity. It is also unnecessary to share the states across network since the states of UAVs that are far away from each other may not provide contribution in decision making. Therefore, UAVs share their states with neighbors only via broadcasting transmission for communication overhead reduction. As a result, in the UAV mesh network, each UAV can only observe the states of itself and its neighbors, which is only a partial observation of the entire environment. Denote the observation of UAV k as $$O_{k,t} := S_{k,t} \cap \{ S_{j,t} | j \in \mathcal{N}_k \},$$

where $S_{k,t}$ is the state of UAV agent k, $\mathcal{N}_k$ is the neighbor set of UAV agent k, $S_{j,t}$ is state of neighbor UAV agent $j \in \mathcal{N}_k$ if the neighbor j is another UAV agent and is empty set if the neighbor j is a cloud server. Therefore, the global state of the environment is the joint observations, i.e., $$\bigcup_{k=1}^{K} O_{k,t} = S_t.$$

Actions: At each time t, the UAV k must make a decision regarding which neighboring node j it should select as next-hop router. Denote as $A_{k,t}$ the action for UAV k at time t. Thus, let $A_{k,t}=j$ if neighboring node j is chosen. Hence, the action space size for UAV K equals the number of neighboring nodes, i.e., $|\mathcal{N}_k|$. Let $A_t := (A_{1,t}, \ldots, A_{K,t})$ be the vector consisting of decisions for the overall K UAVs.

Reward function: RL can transform difficult optimization problems into maximizing the expected cumulative reward problems through appropriate reward function design. When designing reward functions for the routing problem in the UAV mesh network, there are several key aspects that need to be considered:

(1) Queue length: The length of the queue $S_{k,t}$ at a UAV k reflects the number of packets waiting to be transmitted from that node. A lower value of $S_{k,t}$ indicates lower latency, and hence the queue length is penalized when designing reward function.

(2) End-to-end delay (UAV-to-cloud server delay): This is quantified by the transmission time $T_{i,j}$ from node i to node j. The end-to-end delay is a critical metric in network performance, reflecting the time taken for a packet to travel across the network from the source to the destination. Lower values of $T_{i,j}$ would typically contribute positively to the reward function, as they indicate faster transmission, which is usually desirable.

(3) Packet delivery success/failure: This is indicated by an acknowledgement (ACK) signal $\mathbb{1}$ (ACK), which can be either 0 or 1. The $\mathbb{1}$ (ACK) signal is a binary indicator where 1 typically represents the successful delivery of a packet, and 0 indicates failure. Successful delivery $\mathbb{1}(ACK)=1$ would increase the reward, while failure $\mathbb{1}(ACK)=0$ would decrease it. To use $\mathbb{1}(ACK)$ signal, a UAV acknowledges transmitter when it successfully receives a data packet from a neighbor. Each UAV starts a timer to wait for ACK packet when it transmits a data packet. If the timer expires without receiving ACK, the transmission is considered as failure. Otherwise, the transmission succeeds.

(4) Congestion: Congestion in the network is inferred from the case that any UAV's buffer length approaches the maximum value $S_{max}$, denoted by the signal $\mathbb{1}$(congestion). Congestion can lead to packet delays, increased buffer occupancy, and even packet loss when buffer length exceeds the threshold $S_{max}$. Thus, the reward function should be designed to penalize situations where congestion occurs, as it implies a degradation in network performance.

(5) Destination Arrival: This is denoted by signal $\mathbb{1}$(CS), which is again a binary value of 0 or 1. Here, signal $\mathbb{1}$(CS) indicates whether a packet has reached the cloud server or not. Reaching the cloud server is the primary goal, so $\mathbb{1}(CS)=1$ would contribute positively to the reward. To use signal $\mathbb{1}$(CS) mechanism, the cloud server can distribute the combined packet reception information across network.

Based on the key factors described above, a novel reward function is provided as $$R(S_{k,t}, A_{k,t}) := -\alpha \cdot S_{k,t} - \beta \cdot \mathbb{1}(ACK) \cdot T_{k,A_{k,t}} - \kappa \cdot (1 - \mathbb{1}(ACK)) - \eta \cdot \mathbb{1}(\text{congestion}) + \mu \cdot \mathbb{1}(CS),$$

where $\alpha$, $\beta$, $\eta$, $\kappa$ and $\mu$ are positive weight scalars. In the considered routing settings, each UAV aims to maximize its individual reward, at the expense of the other UAVs. This is typical in game-theoretic scenarios. For competitive MARL, the objective of each UAV k could be written as:

$$\max_{\pi_k} \mathbb{E}_{\pi_k} \left[ \sum_{t=0}^{T} \gamma^t R(S_t, A_{k,t}, A_{-k,t}) \right], \tag{16}$$

where $A_{-k,t}$ denotes the actions of all UAVs other than UAV k, $\pi_k$ is policy, $\gamma \in (0,1]$ is discount factor and Tis data delivery duration. Notice that the optimal policy of UAV k relies on the global state information $S_t$ and all actions of other UAVs, which might be impractical to know by UAV k due to communication overhead. The goal is to provide an approximate MARL solution that only requires partial local observations.

Focus Coordination Multi-Agent DDPG (FC-MADDPG) Algorithm

A common conventional technique in managing dense UAV mesh network routing as in (16) relies on multi-agent DDPG (MADDPG) algorithm, which often grapples with significant drawbacks. The primary challenge is the substantial communication overhead due to the constant need for information exchange among UAVs, which strains network resources, especially in bandwidth-limited scenarios. The next challenge is computational complexity due to the excessive states shared across the network. It is possible that the states of UAVs far away from each other may not contribute positively. Furthermore, these traditional methods typically depend on a central controller for coordination, creating a bottleneck in terms of computational load and posing a risk as a single point of failure, particularly as the network scales. This centralized approach also struggles with adaptability in dynamic environments, limiting the overall efficiency and robustness of the system.

To overcome these limitations, this invention provides a Focus Coordination Multi-Agent DDPG (FC-MADDPG) algorithm. This algorithm innovatively integrates an attention mechanism, allowing each UAV to autonomously determine the relevance of information from neighboring agents, thus significantly reducing unnecessary communication overhead. By decentralizing the decision-making process, FC-MADDPG algorithm eliminates the need for a central controller, enhancing the scalability and resilience of UAV networks. This attention-guided algorithm is adept at adapting to changing environments and network topologies, ensuring that UAVs focus on processing the most pertinent information. The FC-MADDPG algorithm, therefore, presents a robust, efficient, and scalable solution, bypassing the drawbacks of conventional methods and offering a significant advancement in the management of dense UAV networks.

The MADDPG algorithm is an extension of the DDPG algorithm for multi-agent environments. The original DDPG algorithm is a model-free, off-policy actor-critic method designed for environments with continuous action spaces. When adapting DDPG for multi-agent systems like UAV mesh networks, the algorithm needs to handle the interactions between agents and the partial observability of the environment. The probability-based methods can not only be applied to the MADDPG algorithm framework but also make use of a method called Gumbel-Softmax to approximate the gradient of discrete stochastic policies.

The following is a detailed outline of the FC-MADDPG algorithm. FIG. 5 shows the FC-MADDPG algorithm, which includes steps as follows.

Initialization: For each agent k, initializing an actor network $\pi_k(\theta)$ with weights $\theta_k$ and a critic network $Q_k(\omega)$ with weights $\omega_k$. Meanwhile, for each agent k, initializing target networks $\pi'_k(\theta)$ with weights $\theta'_k$ and $Q'_k(\omega)$ with weights $\omega'_k$. Since FC-MADDPG is an off-policy method, each agent k can hold a replay buffer $\mathcal{B}_k$ for storing experience tuples of each agent and its neighboring agents, which is initialized as an empty set.

Episodic Learning: At the beginning of each episode, reset the environment to the starting state, and each agent k receives the initial observation $O_k$.

At each step, each agent k receives the observations $O_j$ and actions $A_j$ from its neighbor j, $\forall j \in \mathcal{N}_k$. The critic network $Q_k$ for each agent is updated to consider the effective state and action as $$Q_k(\{O_j, A_j, \forall j \in \mathcal{N}_k\}; \omega_k),\qquad(17)$$

where $\omega_k$ are the parameters of the critic network. In particular, inside the critic network, agent k leverages the attention mechanism to compute a weighted sum of observations and actions from each neighboring agent j. The output of the attention layer of agent k is denoted as $$c_k = \text{Attention}(\{[O_j, A_j], \forall j \in \mathcal{N}_k\}; W_q, W_u, W_v),\qquad(18)$$

where Attention module follows (9)-(11) and $W_q$, $W_u$, $W_v$ are the parameters of the attention model.

Similarly, the actor-network (policy) $\pi_k$ for agent k is updated based on both the effective output of the Attention module based on local observation $\{O_j, \forall j \in \mathcal{N}_k\}$ as $$\pi_k(\{O_j, \forall j \in \mathcal{N}_k\}; \theta_k),\qquad(19)$$

where $\theta_k$s are the parameters of the actor-network.

Then, the agent k selects action $A_k$ using actor-network $\pi_k$ based on the effective state information and add exploration noise $\mathcal{N}$ to encourage policy exploration. After applying the selected actions to the environment, each agent gets the new state observations, rewards, and whether the episode has ended. Then, it stores the transition tuple ($\{O_j, j \in \mathcal{N}_k\}$, $A_k$, $r_k$, $\{O_{j'}, j \in \mathcal{N}_k\}$) in the replay buffer $\mathcal{B}_k$.

Randomly sample a mini-batch of transitions from $\mathcal{B}_k$. For each agent k, update the critic $Q_k$ by minimizing the loss between its predictions and the target values, which are calculated using the target networks. Update the actor $\pi_k$ using the sampled policy gradient, derived from the critic's output. Update the target networks $\pi'_k$ and $Q'_k$ with a mix of target and main network weights, controlled by $\tau$. If the terminal state is reached or the maximum number of timesteps is exceeded, reset the environment for the next episode. A set of optimized policies for each UAV that ensures efficient routing and robust mesh network performance.

Figure 6:
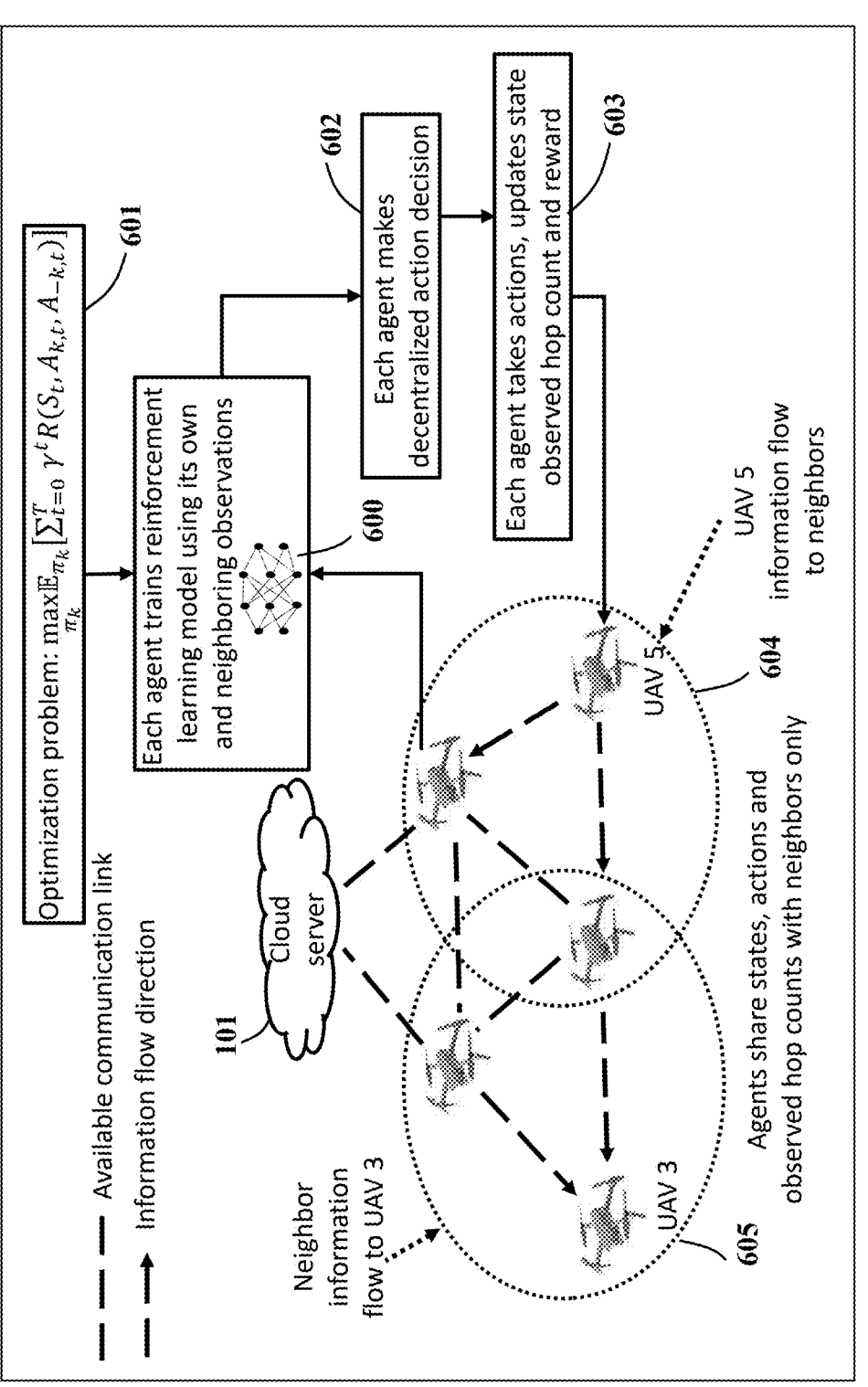
FIG. 6 demonstrates the flow chart of the FC-MADDPG algorithm, according to some embodiments of the present invention.

FIG. 6 demonstrates the flow chart of the FC-MADDPG algorithm. Each UAV agent trains a reinforcement learning model 600 based on the formulated optimization problem 601 by using its own observation and neighbor observations. After training, the UAV agent decides 602 to which neighbor it will forward its data packets. The UAV agent then transmits 603 data packets using the learned route, updates the number of stored data packets, the observed hop count and reward. The UAV agent also shares the number of stored data packets, action and observed hop count with its neighbors, e.g., UAV agent 5 broadcasts 604 its information to its neighbors and the UAV agent 3 receives 605 information from its neighbors.

Figure 7A:
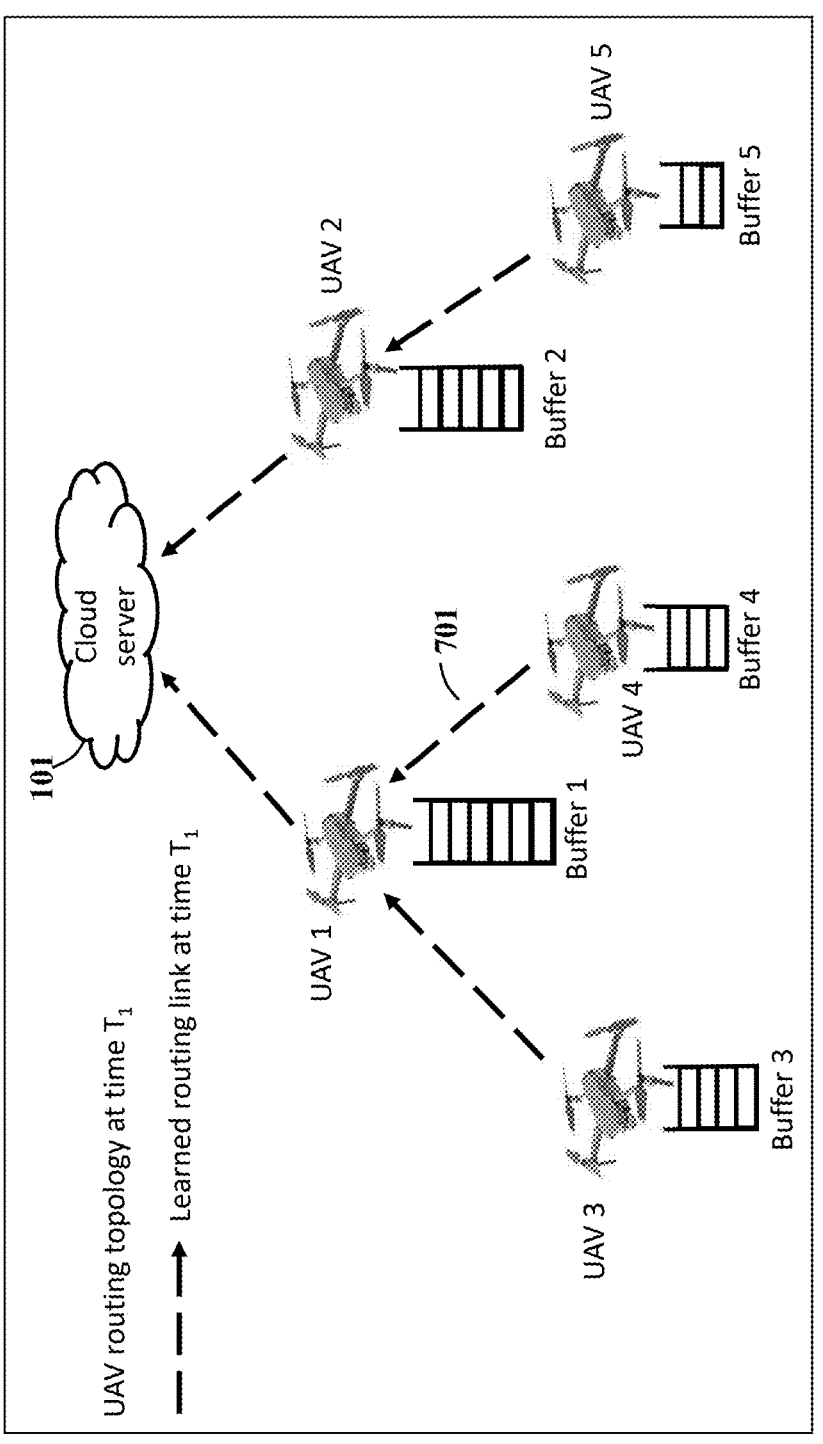
FIG. 7A shows the multi-agent learned routing topology for the second-tier network at time $T_1$, according to some embodiments of the present invention.

Once action policies are learned, UAVs transmit their data to the learned next hop neighbors. FIG. 7A shows an example of learned policies for the second-tier network at time $T_1$, in which UAV 1 and UAV 2 transmit their data packets to cloud server 101 directly, UAV 3 forwards its data packets to UAV 1, UAV 5 sends its data packets to UAV 2 and UAV 4 forwards 701 its data packets to UAV 1 at time $T_1$.

Figure 7B:
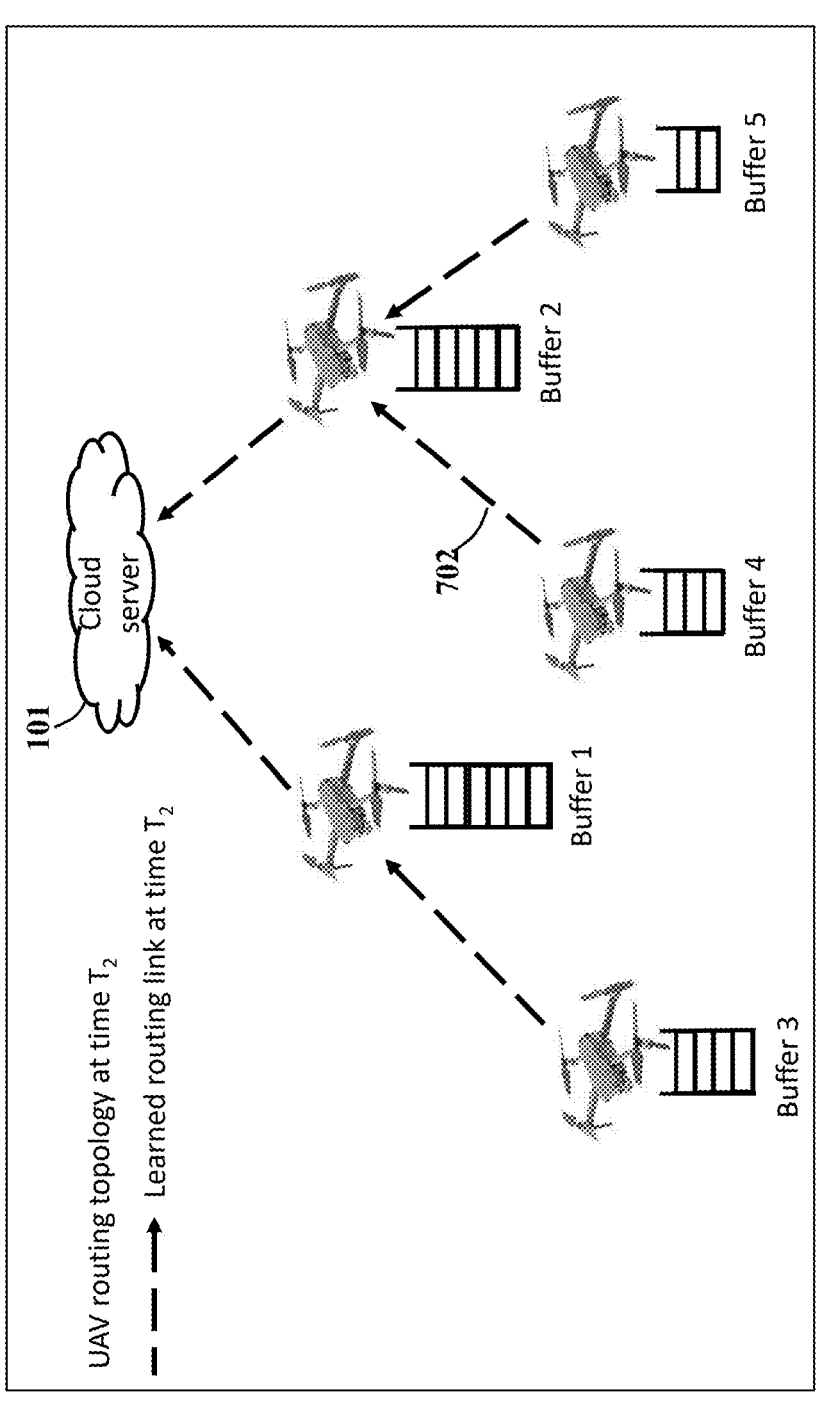
FIG. 7B illustrates the multi-agent learned routing topology for same second-tier network at time $T_2$, according to some embodiments of the present invention.

However, due to the dynamics of UAVs, the learned policies change. For example, FIG. 7B shows learned policies for same set of UAVs are different at time $T_2$, in which UAV 1 and UAV 2 transmit their data packets to cloud server 101 directly, UAV 3 forwards its data packets to UAV 1, UAV 5 sends its data packets to UAV 2, and however, UAV 4 forwards 702 its data packets to UAV 2 at time $T_2$.

Performance Evaluation

The comprehensive performance evaluation has been conducted. The invented FC-MADDPG algorithm is compared with three benchmark algorithms: (1) The popular Deep Q-Network (DQN) algorithm; (2) The centralized MADDPG algorithm in which an agent is selected to perform centralized training by collecting information from all agents and each agent however makes decision independently and (3) The independent MADDPG algorithm in which each agent independently performs training and makes decision without information sharing.

Figure 8:
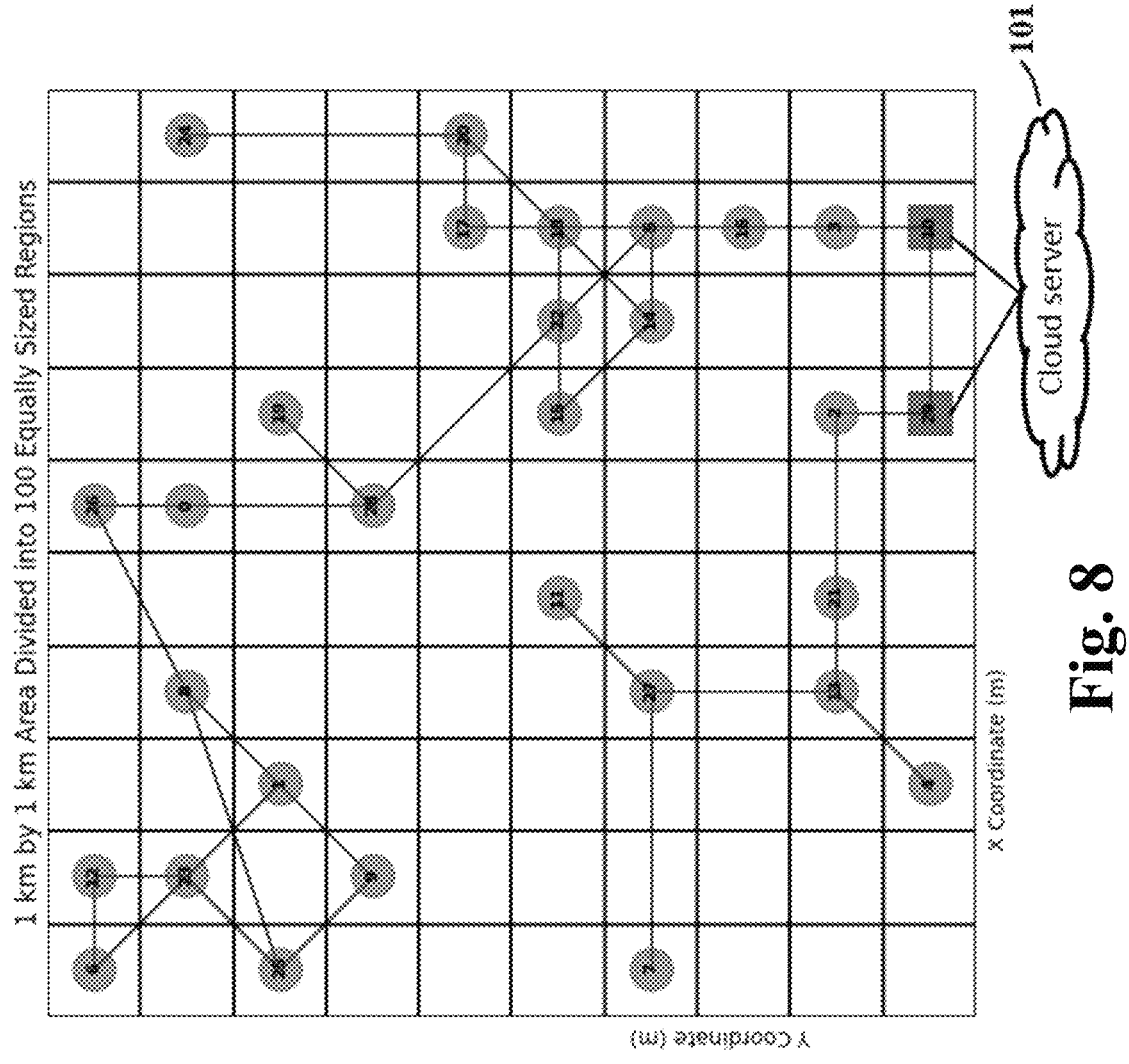
FIG. 8 shows an example of 30 UAV mesh deployment used in performance evaluation, according to some embodiments of the present invention.

FIG. 8 shows a UAV mesh network topology with 30 UAVs, in which 30 UAV nodes are randomly deployed in a 1 km-by-1 km area with cloud server being placed outside of UAV node deployment area. The LTE/5G base station is integrated into the cloud server as one node and UAVs 10 and 29 are directly connected to the cloud server 101.

The simulation setup for the performance evaluation of the FC-MADDPG algorithm incorporates a detailed model of packet handling and routing within a UAV mesh network, characterized by the following parameters and rules: Each UAV, functioning both as a router and as a learning agent, is equipped with a buffer that stores incoming data packets for further transmission. This buffer is limited to a maximum capacity of 10 packets, ensuring that packet flow is controlled and preventing buffer overflow under normal operation. Each UAV is responsible for handling a predefined number of packets, specifically 25, originating from its designated local area of coverage. The UAVs operate in a synchronized fashion, where each UAV sends one packet to its learned next-hop router simultaneously during each routing decision interval. Packet arrivals at each UAV are modeled to follow an exponential distribution, introducing stochastic elements to the arrival times, thus emulating realistic network traffic conditions. A packet loss event is triggered if the time taken for a packet to be delivered exceeds the duration allocated for each routing decision. Congestion within a UAV's buffer is simulated to occur when the number of stored packets surpasses the buffer's maximum capacity, reflecting real-world network challenges such as bandwidth limitations and high traffic volumes. Proactive fetching of new packets is implemented when a UAV's buffer occupancy falls below a threshold of 5 packets, ensuring continuous data flow and optimal utilization of network resources. The simulation episode is concluded once all packets have been successfully relayed to cloud server, signifying the completion of a data transmission cycle within the UAV network.

Figure 9:
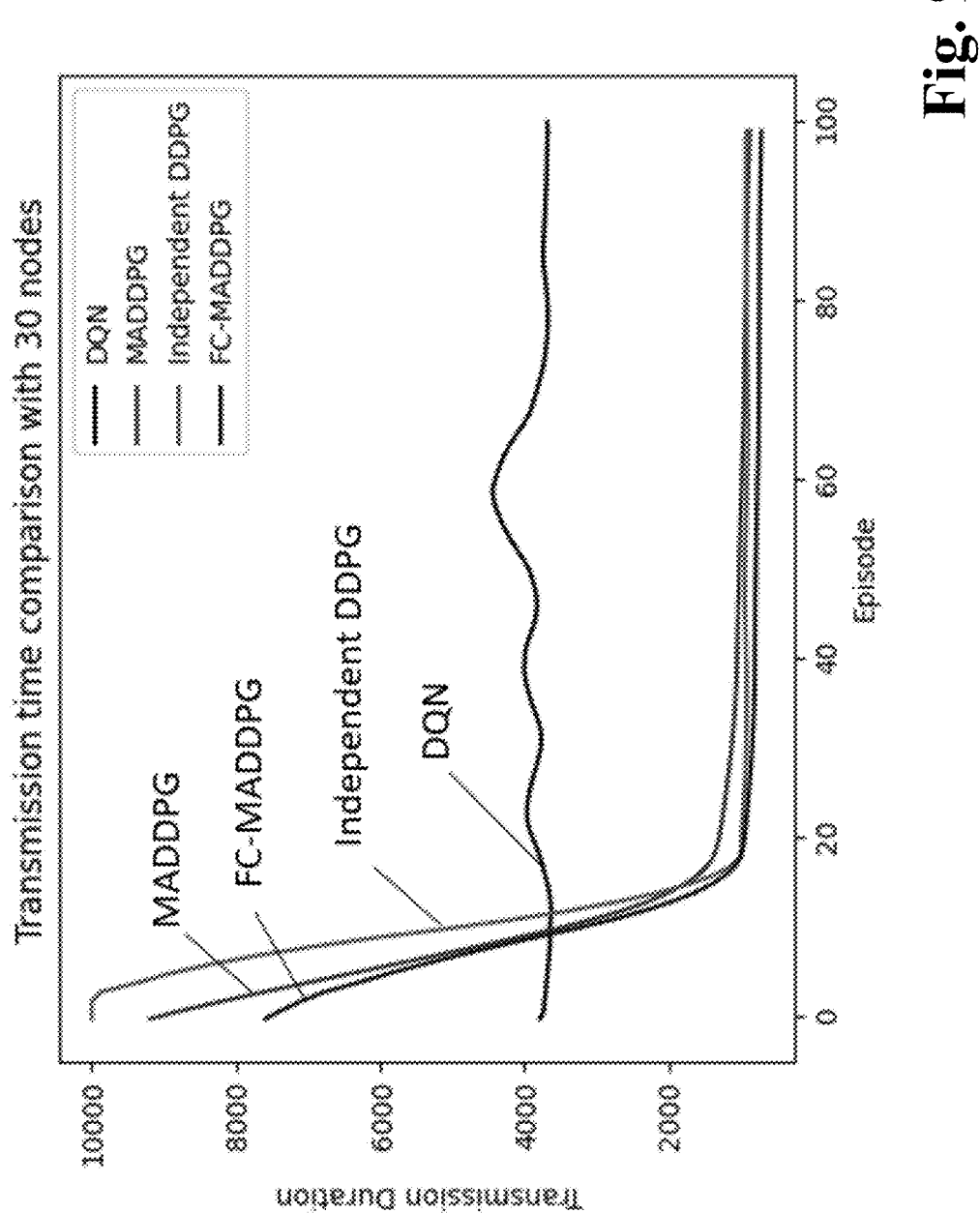
FIG. 9 depicts data delivery latency results by different machine learning algorithms for the UAV mesh network shown in FIG. 8, according to some embodiments of the present invention.

FIG. 9 shows data delivery duration, i.e., latency, by different machine learning algorithms. Notably, the centralized MADDPG does not yield the best results. Its use of global information appears to be excessive in large sparse topologies, leading to inefficiencies. In contrast, the FC-MADDPG algorithm demonstrates superior performance by outperforming all benchmark algorithms. This improvement is attributed to its ability to focus on pertinent information from neighboring nodes, reducing the unnecessary processing of redundant data. Moreover, the DQN algorithm does not converge, suggesting that DQN is not applicable to complex networks with large heterogeneous action space. Specifically, the FC-MADDPG requires 712 transmission steps to deliver all packets to the cloud server. The centralized MADDPG requires 874 steps, which is around 123% of FC-MADDPG transmission steps. Independent DDPG requires 917 steps, which is around 129% of FC-MADDPG transmission steps. DQN requires 3684 transmission steps, which is around 517% of FC-MADDPG transmission steps.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided on a single computer or distributed among multiple computers. Such processors may be implemented as integrated circuits, with one or more processors in an integrated circuit component. Though, a processor may be implemented using circuitry in any suitable format.

Also, the embodiments of the disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the disclosure has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

The invention claimed is:

1. An unmanned aerial vehicle (UAV) agent for delivering data packets from agriculture sensors deployed in agriculture fields to at least one cloud server via a two-tier hybrid network architecture consisting of at least one first-tier network and a second-tier network, wherein the at least one first-tier network is formed by agriculture sensor clusters of the agriculture sensors and at least one UAV agent via first links, the second-tier network is formed by UAV agents and the at least one cloud server via second links, comprising:

a first transceiver configured to receive the data packets from the agriculture sensors via the first links;

a second transceiver configured to receive the data packets from neighboring UAV agents and route the received data packets to the at least one cloud server via the second links;

a memory configured to store geographical locations and the first links corresponding to the agriculture sensors, the second links corresponding to the neighboring UAV agents or the at least one cloud server, a number of agriculture sensors in the corresponding agriculture sensor clusters, computer executable programs including a Focus Coordination Multi-Agent Deep Deterministic Policy Gradient (FC-MADDPG) algorithm;

a processor configured to perform steps of the computer executable programs, wherein the steps comprise:

receiving the data packets in each time interval during data collection process from selected agriculture sensors storing the data packets, using the first transceiver via the first links of the at least one first-tier network, wherein the data collection process is performed by solving a first Markov Decision Process (MDP) problem formulated based on states of the agriculture sensors;

learning routes to the at least one cloud server, using the second transceiver via the second links of the second-tier network, by solving a second MDP problem formulated based on states of UAV agents, wherein the formulated second MDP problem is solved by using multi-agent reinforcement learning (MARL), wherein a FC-MADDPG algorithm is provided to implement the MARL, wherein the execution of the FC-MADDPG algorithm outputs the route for each UAV agent; and routing the received data packets, using the second transceiver via the second links of the second-tier network, to the at least one cloud server based on the learned routes.

2. The UAV agent of claim 1, wherein the at least one first-tier network uses a short-range communication protocol based on IEEE 802.11 (Wi-Fi) or IEEE 802.15.4 (Wi-SUN) or combination thereof, wherein the second-tier network applies a long-range communication protocol based on LTE/5G or LoRa or combination thereof.

3. The UAV agent of claim 2, wherein the short-range communication protocol is used for the first links between the UAV and the agriculture sensors, wherein the long-range communication protocol is used for the second links between the UAV agents and between the UAV agents and the cloud servers.

4. The UAV agent of claim 2, wherein the agriculture sensors are divided into the agriculture sensor clusters based on geometrical locations and a connectivity of the short-range communication protocol such that the agriculture sensors within an agriculture sensor cluster form a fully connected network.

5. The UAV agent of claim 4, wherein the number of the at least one first-tier network is equal to the number of the agriculture sensor clusters, wherein the number of agriculture sensors in an agriculture sensor cluster is a variable.

6. The UAV agent of claim 1, wherein the at least one first-tier network is multipoint-to-point (MP2P) network and the second-tier network is mesh network.

7. The UAV agent of claim 1, wherein the at least one first-tier network is used to collect data packets by UAV agents from the agriculture sensor clusters, wherein the second-tier network is used to route the data packets from UAV agents to cloud servers, wherein the data collection and data routing are performed simultaneously during a data delivery process.

8. The UAV agent of claim 1, wherein the state of the first Markov Decision Process (MDP) problem with an agriculture sensor cluster $\mathcal{N}$ consisting of N sensors at time t is $X_t:=(X_{1,t}, \ldots, X_{N,t})\in \mathbb{N}^N$, where $X_{n,t}$ is the number of outstanding data packets stored at agriculture sensor $n\in \mathcal{N}$.

9. The UAV agent of claim 1, wherein an action of the first Markov Decision Process (MDP) problem with an agriculture sensor cluster $\mathcal{N}$ consisting of N sensors at time t is $U_t:=(U_{1,t}, \ldots, U_{N,t})$, where $U_{n,t}$ denotes the action taken for agriculture sensor $n\in \mathcal{N}$ at time t, wherein $U_{n,t}=1$ indicates sensor n is served and $U_{n,t}=0$ indicates otherwise.

10. The UAV agent of claim 1, wherein a transition kernel of an n-th agriculture sensor of the first Markov Decision Process (MDP) problem with an agriculture sensor cluster $\mathcal{N}$ consisting of N sensors is expressed as $$X_{n,t+1} = \begin{cases} X_{n,t}+1, & w.p.\ p_n(1-U_{n,t})+p_nU_{n,t}(1-q_n), \\ X_{n,t}, & w.p.\ p_nU_{n,t}q_n+(1-p_n)(1-U_{n,t})+ \\ & \qquad (1-p_n)U_{n,t}(1-q_n), \\ X_{n,t}-1, & w.p.\ (1-p_n)U_{n,t}q_n \end{cases}$$

where $p_n$ is a probability that sensor $n\in \mathcal{N}$ measures agriculture data and $q_n$ is the probability that sensor $n\in \mathcal{N}$ successfully transmits data packet to a serving UAV agent.

11. The UAV agent of claim 1, wherein the first Markov Decision Process (MDP) problem with an agriculture sensor cluster $\mathcal{N}$ consisting of N sensors is to derive a policy $\pi$ such that $$\min_{\pi\in\Pi} C_\pi := \limsup_{T\to\infty}\sum_{n=1}^{N}\frac{1}{T}\mathbb{E}_\pi\left[\sum_{t=0}^{T}X_{n,t}\right],$$

$$s.t.\sum_{n=1}^{N} U_{n,t} \le C, \forall\ t,$$

where C is capacity constraint taking account of a bandwidth of the first links and a storage of the UAV agent such that only C out of N sensors can be served within a time interval.

12. The UAV agent of claim 1, wherein the state of the second MDP problem with K UAV agents at time t is $S_t:=(S_{1,t}, \ldots, S_{K,t})\in \mathbb{N}^K$, where state $S_{k,t}$ includes the number of stored data packets and a hop observed (HO) by UAV agent $k\in \mathcal{K}$.

13. The UAV agent of claim 1, wherein an observation space of the second MDP problem with K UAV agents at time t is $$\bigcup_{k=1}^{K} O_{k,t},$$

where $O_{k,t}$ is an observation of UAV agent $k\in \mathcal{K}$ denoted as $$O_{k,t}:=S_{k,t}\cap\{S_{j,t}|j\in \mathcal{N}_k\},$$

where $S_{k,t}$ is the state of UAV agent k, $\mathcal{N}_k$ is the neighbor set of UAV agent k, $S_{j,t}$ is state of neighbor UAV agent $j\in \mathcal{N}_k$.

14. The UAV agent of claim 13, wherein a neighbor j of the UAV agent k can be another UAV agent or a cloud server, wherein $S_{j,t}$ is state of the neighbor j if the neighbor j is another UAV agent and $S_{j,t}$ is an empty set if the neighbor j is a cloud server.

15. The UAV agent of claim 1, wherein actions of the second MDP problem with K UAV agents at time t is $A_t:=(A_{1,t}, \ldots, A_{K,t})$, where $A_{k,t}$ is an action of UAV agent k at time t with $A_{k,t}=j$ indicating neighboring agent j is chosen as next hop router to route data packet.

16. The UAV agent of claim 1, wherein UAV agents collaboratively solve the second MDP problem by applying multi-agent reinforcement learning (MARL), wherein each UAV acts as a reinforcement learning agent.

17. The UAV agent of claim 16, wherein the reinforcement learning reward design incorporates factors including the number of stored data packets $S_{k,t}$, end-to-end delay $T_{k,A_{k,t}}$, successful packet transmission rate (ACK), congestion $\mathbb{1}$(congestion) reflected by a difference between storage capacity and the number of stored data packets, and successful data packet delivery rate $\mathbb{1}$(CS) such that $$R(S_{k,t}, A_{k,t}) := -\alpha \cdot S_{k,t} - \beta \cdot \mathbb{1}(ACK)\cdot T_{k,A_{k,t}} -$$
$$\kappa \cdot (1-\mathbb{1}(ACK))-\eta \cdot \mathbb{1}(\text{congestion})+\mu \cdot \mathbb{1}(CS),$$

where $\alpha$, $\beta$, $\gamma$, $\kappa$ and $\mu$ are positive weight scalars.

18. The UAV agent of claim 16, wherein each UAV agent maximizes its individual reward $R(S_{k,t}, A_{k,t})$ at an expense of the other UAV agents, wherein an objective of a UAV agent k is written as $$\max_{\pi_k}\mathbb{E}_{\pi_k}\left[\sum_{t=0}^{T}\gamma^t R(S_t, A_{k,t}, A_{-k,t})\right],$$

where $A_{-k,t}$ denotes actions of all UAV agents other than UAV agent k, $\gamma\in (0,1]$ is a discount factor to dampen an effect of future rewards and T is data delivery duration.

19. The UAV agent of claim 18, wherein each UAV agent solves its maximization problem by applying the FC-MADDPG algorithm, wherein the execution of the FC-MADDPG algorithm outputs the route for each UAN agent; wherein the FC-MADDPG algorithm includes steps of initialization and episodic learning.

20. The UAV agent of claim 19, wherein in initialization, each UAV agent k, initializes an actor network $\pi_k(\theta)$ with weights $\theta_k$ and a critic network $Q_k(\omega)$ with weights $\omega_k$, wherein each UAV agent k initializes target networks $\pi'_k(\theta)$ with weights $\theta'_k$ and $Q'_k(\omega)$ with weights $\omega'_k$.

21. The UAV agent of claim 18, wherein in episodic learning, each UAV agent recursively updates an actor network $\pi_k(\theta)$ and critic network $Q_k(\omega)$ by receiving observations $O_j$ and the actions $A_j$ from its neighbor UAV agent j and applying an attention model.

22. A two-tier hybrid network architecture comprising:

agriculture sensors configured to collect measurements, store and transmit data packets of the measurements, wherein the agriculture sensors are deployed in agriculture fields;

unmanned aerial vehicle (UAV) agents, wherein each of the UAV agents is configured, in communication with one or more agriculture sensors, to form at least one first-tier network with the agriculture sensors for receiving, storing, and transmitting the data packets collected by the agriculture sensors;

at least one cloud server in communication with at least one UAV agent, forming a second-tier network, wherein the second-tier network is configured to route the data packets to the at least one cloud server from the UAV agents;

wherein the at least one first-tier network is formed by agriculture sensor clusters of the agriculture sensors and the at least one UAV agent among the UAV agents via first links, wherein the second-tier network is formed by the UAV agents and the at least one cloud server via second links, wherein each of the UAV agents comprises:

a first transceiver configured to receive the data packets from the agriculture sensors via the first links;

a second transceiver configured to receive the data packets from neighboring UAV agents and route the received data packets to the at least one cloud server via the second links;

a memory configured to store geographical locations and the first links corresponding to the agriculture sensors, the second links corresponding to the neighboring UAV agents or the at least one cloud server, a number of agriculture sensors in the corresponding agriculture sensor clusters, computer executable programs including a Focus Coordination Multi-Agent Deep Deterministic Policy Gradient (FC-MADDPG) algorithm;

a processor configured to perform steps of the computer executable programs, wherein the steps comprise:

receiving the data packets in each time interval during data collection process from selected agriculture sensors storing the data packets, using the first transceiver via the first links of the at least one first-tier network, wherein the data collection process is performed by solving a first Markov Decision Process (MDP) problem formulated based on states of the agriculture sensors;

learning routes to the at least one cloud server, using the second transceiver via the second links of the second-tier network, by solving a second MDP problem formulated based on states of UAV agents, wherein the formulated second MDP problem is solved by using multi-agent reinforcement learning (MARL), wherein a FC-MADDPG algorithm is provided to implement the MARL, wherein the execution of the FC-MADDPG algorithm outputs the route for each UAV agent; and routing the received data packets, using the second transceiver via the second links of the second-tier network, to the at least one cloud server based on the learned routes.

* * * * *